US005206660A

United States Patent [19]

Cochrane et al.

[11] Patent Number: 5,206,660

[45] Date of Patent: Apr. 27, 1993

[54] AIRBORNE THERMAL PRINTER

[75] Inventors: Goeffrey G. Cochrane, Longmont, Colo.; Michael D. Tartamella, Aurora; Philip W. McLean, Richfield; Samuel K. Taylor, Chardon; Christ H. Heipp, Chagrin Falls, all of Ohio

[73] Assignee: Summit World Trade Corporation, Hudson, Ohio

[21] Appl. No.: 705,517

[22] Filed: May 24, 1991

[51] Int. Cl.[5] .................... G01D 15/00; G01D 15/10; B41J 15/00; B41J 15/16

[52] U.S. Cl. .................... 346/76 PH; 346/145; 400/578; 400/618

[58] Field of Search .................... 346/76 PH, 145; 400/120 HE, 578, 613, 618

[56] References Cited

U.S. PATENT DOCUMENTS

| | | | |
|---|---|---|---|
| 3,611,431 | 10/1971 | Rosmanith | 346/145 |
| 3,827,544 | 8/1974 | Smith | 400/613 |
| 3,915,281 | 10/1975 | Blomquist et al. | 400/613 X |
| 4,013,159 | 3/1977 | Okabe | 400/578 X |
| 4,014,426 | 3/1977 | Neufeld | 400/613 |
| 4,167,346 | 9/1979 | Holland-Letz | 400/618 |
| 4,253,104 | 2/1981 | Paulsen | 346/145 |
| 4,641,980 | 2/1987 | Matsumoto et al. | 400/120 |
| 4,755,833 | 7/1988 | Tanigawa et al. | 400/120 |
| 4,827,419 | 5/1989 | Selby . | |
| 4,848,945 | 7/1989 | Sone | 400/120 X |
| 4,909,645 | 3/1990 | Sudo et al. | 400/120 |

FOREIGN PATENT DOCUMENTS

| | | |
|---|---|---|
| 0372753 | 6/1990 | European Pat. Off. . |
| 3444044 | 5/1986 | Fed. Rep. of Germany . |
| 2168929 | 7/1986 | United Kingdom . |

*Primary Examiner*—Benjamin R. Fuller
*Assistant Examiner*—Eric Frahm
*Attorney, Agent, or Firm*—Watts, Hoffmann, Fisher & Heinke

[57] ABSTRACT

A mobile printer having features particularly suited for use in a mobile conveyance such as an airplane. The printer stores a first data set in a memory that is accessed under control of a programmable controller. The printer then receives a second data set via a communications transceiver. Data from the first and second data sets are combined to form a composite bit mapped image which is printed by means of a thermal printhead controlled by the programmable controller.

The thermal printhead uses rolls of thermally sensitive paper which are supported by means of a mandrel roll. The thermal paper is positioned adjacent the print head by means of a platen roll. A biasing force is provided to bias the platen roll away from the print head when a door in the printer housing is opened to provide a space into which the free end of the roll of paper can enter. A cam is provided on the underside of the door to close the gap between the platen roll and the print head when the housing door is closed so that the platen roll presses the paper against the print head while the printing operation takes place. A back pressure acts on the paper upstream of the platen and idler rolls to straighten the paper with respect to the print head.

10 Claims, 19 Drawing Sheets

302

AIRBORNE THERMAL PRINTER

FIELD OF THE INVENTION

The present invention concerns a mobile printer particularly suited for use in an airplane.

BACKGROUND ART

Airlines commonly use data processing and telecommunications equipment for communicating with their airplanes. Prior art proposals suggest the use of portable navigational planning systems that create charts for use by pilots. U.S. Pat. No. 4,827,419 to Selby which issued May 2, 1989, is an example of a prior art proposal for a system for retrieving data from a database for use as a navigational aid. Air navigation flight charts may be printed on board the plane in conjunction with a trip confirmation and an FAA flight plan. The Selby patent suggests use of a thermal printer having a high-resolution printhead for printing charts having a size of approximately 5½"×8". The '419 patent describes the printer as being non-crucial to the operation of the database information conveying system and any commercially available printer is suggested for use.

A mobile printer presents issues of reliability, maintainability and use not encountered in the design of a stationary printer permanently attached to the output of a stationary computer. The mobile printer must be easy to use and able to withstand the demanding operating conditions encountered during flight. Additionally, the mobile printer must be able to convey information from multiple sources. If all data is generated and/or stored within the printer and/or a computer attached to the printer, standard techniques of transmitting that data to the printhead are appropriate. If, however, the data is derived from multiple sources including sources remotely located from the mobile printer, the printer control mechanism must accommodate the telecommunications protocols used in conveying the information.

The suggestion in the '419 patent to Selby that a standard printhead and interface between printer and computer may be used may be true for the database system disclosed in the '419 patent. It is believed, however, that this suggestion is too simplistic an approach for an efficient, reliable mobile print system.

DISCLOSURE OF THE INVENTION

The present invention concerns a mobile printer having features particularly suited for use in a mobile conveyance. The mechanical construction of the printer and data protocols for presenting information to the printer have been customized to provide an efficient, easy-to-use means for airborne data presentation. A particular application of a printer constructed in accordance with the invention is to display information within an airplane cockpit to aid in navigating the airplane.

In accordance with one embodiment of the invention, a mobile printer includes a printhead for generating a composite image on a hard copy output. A printer memory stores data corresponding to static information and a transceiver receives variable data from a remote location.

One example of the variable data is the weather information available from various sources for use in preparing hard copy navigational aids for use by the pilot. The static data for such an example would correspond to a map of the vicinity that could be superimposed or combined with the variable weather data from the National Weather Service or other weather reporting entity.

A controller coupled to the printer combines or interleaves the two sources of data and applies this information in the form of electrical signals for controlling the printing of the combined data.

The mechanism for storing data within the printer is preferably an electronically erasable read-only memory. This electrically erasable read-only memory can be re-programmed under the command of a programmable controller. This allows the programmable controller to receive programming instructions via a telecommunications link and re-program the static data stored within the printer.

A preferred printer is a thermal printer having a commercially available printhead that can be activated in different levels by control of output signals to the printhead. This type of printer can be utilized in printing either grey scale or dithered images on thermal print paper.

The versatility of the preferred mechanism for receiving and storing data in the printer is complemented by a compact yet convenient paper feed mechanism suited to cockpit use. In a preferred embodiment, the printer uses rolls of thermally-sensitive paper which must be replaced periodically by an operator. Where the printer is to be used in an airplane cockpit, the replacement of the paper must be relatively simple and fast so that the operator, which is likely to be a pilot, co-pilot or navigator, can concentrate on other aspects of the flight. To change a roll of paper in the preferred printer, the operator need only slip the hollow core of the new roll of paper over a mandrel roll, drop the mandrel roll into the printer, insert the end of the roll of paper into a nip between two paper-positioning rolls and close the printer door. The paper feed mechanism inside the printer automatically positions the paper against the print head and straightens the paper for the operator as the paper is advanced in the printer.

The preferred printer is contained in a housing which has a door on one side. The roll of paper itself is supported by a mandrel roll while the end of the roll of paper is restrained in a nip formed between an idler roll and a platen roll. An idler assembly rotatably supports both the idler roll and a carriage. The carriage rotatably supports the platen roll.

A cam on the underside of the printer housing door forces the platen roll away from the print head when the printer door is open. When the printer door is closed, coil springs pull upwardly on the carriage, rotating the carriage so that the platen roll moves toward the print head. The pressure of the platen roll against the paper holds the paper while the image is transferred by the print head.

The preferred paper feed mechanism also includes a brake which applies a back pressure against the hollow core over which the paper is rolled. It has been found that a back pressure on the core applied while the paper is being advanced by the motion of the platen roll tends to straighten the paper with respect to the print head. This permits the operator to insert a new roll of paper into the printer quickly without having to carefully align the paper inside the printer. Furthermore, the back pressure tends to maintain the alignment of the paper during the printing operation so that high quality images are continuously produced. In a preferred embodiment of the printer, the braking mechanism comprises a biased arm pivotably supported by one of the mandrel roll supporting blocks.

Advantageously, the mandrel roll is supported at either end by mandrel roll supporting blocks which are mounted inside the housing. The end portions of the mandrel roll fit into recesses on the side faces of the mandrel roll supporting blocks. In order to permit the mandrel roll to be dropped into the printer from above, the recesses open through the top surfaces of the mandrel rolls. Levers pivotably supported by the mandrel roll supporting blocks include top portions which are contacted by the underside of the printer door when the printer door is closed. When the door is closed, these levers are pivoted to retard the movement of the mandrel roll upward out of the recesses in the mandrel roll supporting blocks and to reduce the movement of the paper if the printer is shaken, as in an aircraft encountering turbulence.

From the foregoing, it will be apparent that one object of the present invention is to provide an compact, efficient and simple-to-use mobile printer capable of combining data from multiple sources into a composite image. This and other objects and advantages of the invention will become clearer from the following description of the preferred embodiment read in connection with the accompanying drawings.

DETAILED DESCRIPTION OF THE PREFERRED EMBODIMENT

Figure 1:
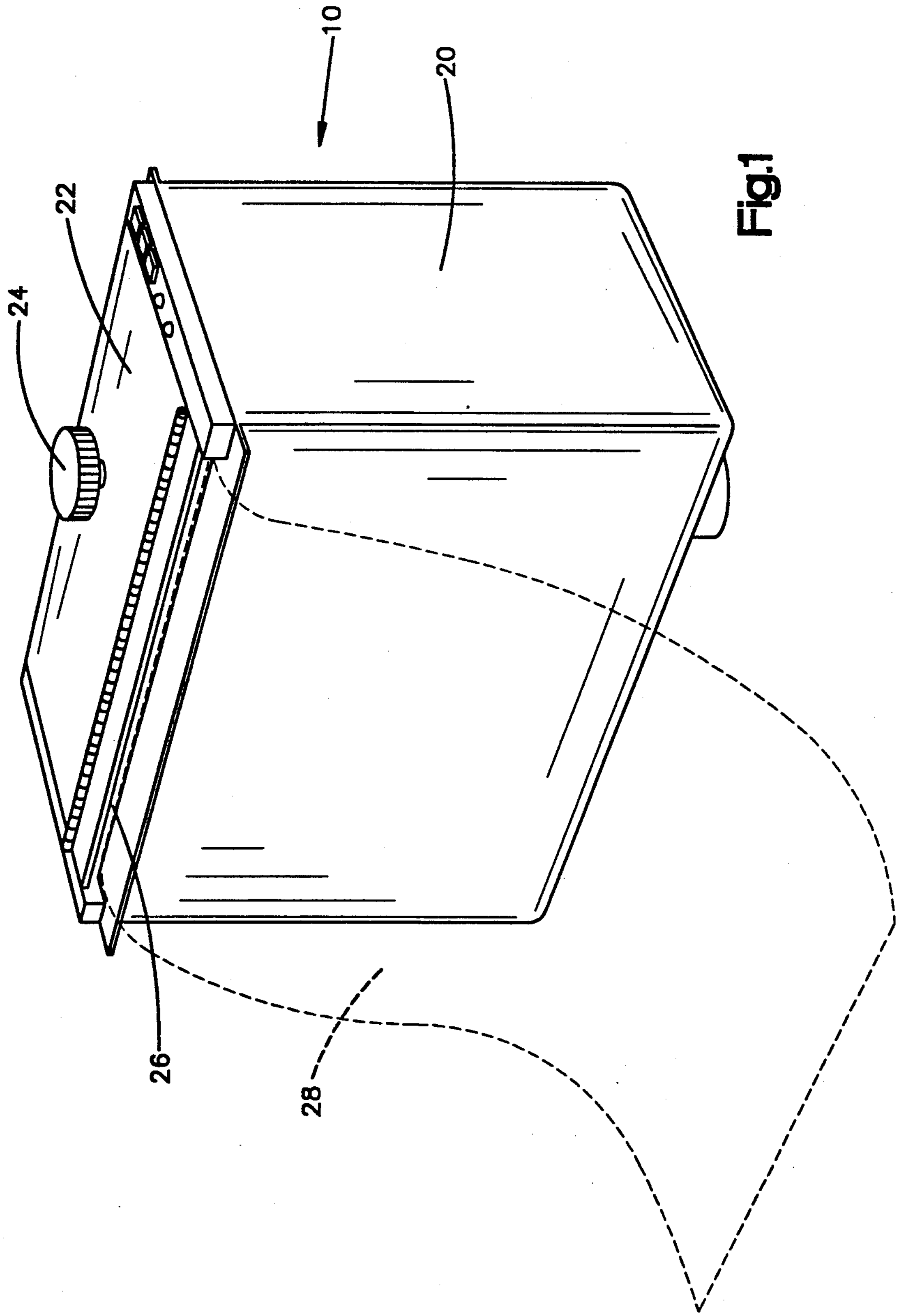
FIG. 1 is a perspective view of a compact mobile printer.

A preferred embodiment of the invention is a printer 10 housed in a box-like housing 20. A door 22 having a latch 24 is hinged to the housing 20 to cover the hollow interior of the housing 20. The housing 20 includes a slit-like opening 26 through which printed paper (shown in phantom as 28 in FIG. 1) is delivered to the operator.

Figure 6:
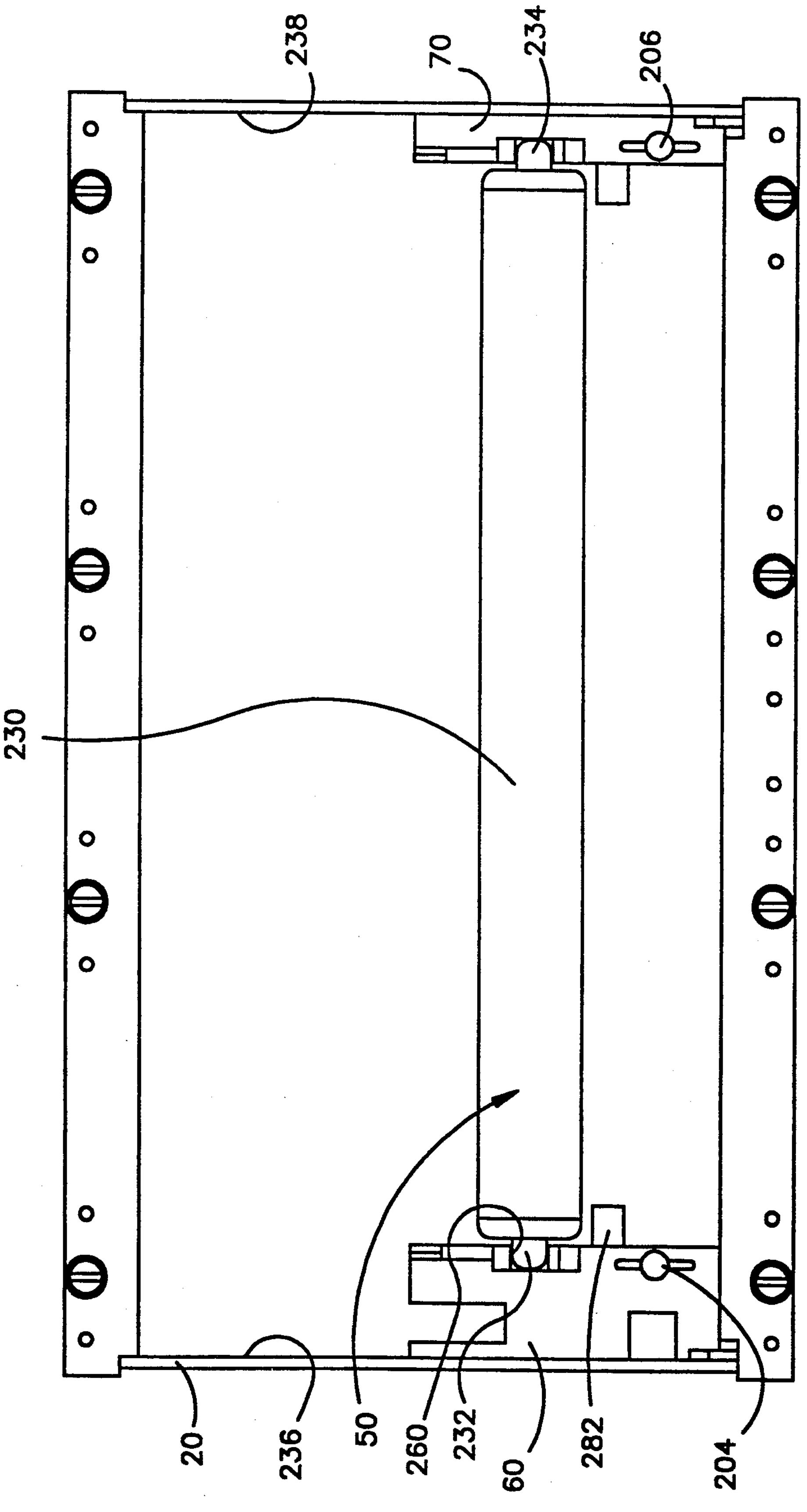
FIG. 6 is a schematic top view of the interior of the housing with the door removed showing the location of the mounting blocks and the mandrel roll.
Figure 8A:
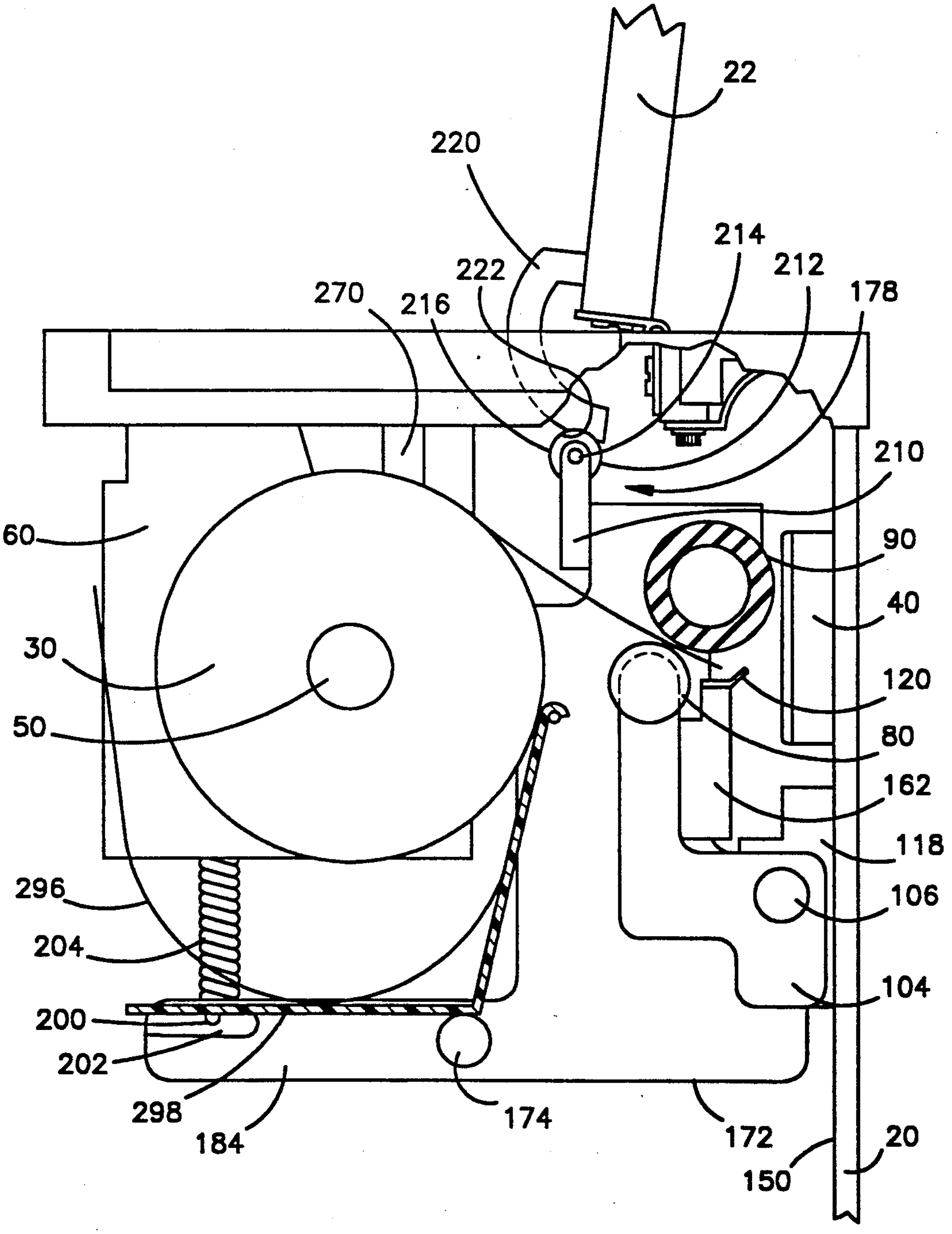
FIGS. 8A and 8B are schematic side views showing the positions of the print head, carriage and paper when the door is open and closed.

The printer 10 uses rolls of thermally sensitive paper 30 (FIG. 8A) on which a thermal print head 40 prints graphical and textual images. The hollow core of the thermally sensitive paper is supported by a mandrel roll 50 (FIG. 6) which, in turn, is supported by a pair of mandrel roll mounting blocks 60, 70. The paper 30 is positioned relative to the print head 40 by an idler roll 80 and a platen roll 90 which engage to form a paper-positioning nip adjacent the print head 40.

The preferred print head 40 comprises a line of 2592 resistors. Each resistor defines a separate pixel. The resistors are controlled by means of a shift register which receives digital on/off commands serially through a single port. The paper 30 is advanced approximately 1/300th of an inch between successive lines of pixels to form an image which appears continuous to the unaided eye.

The idler roll 80 is rotatably supported by an idler assembly 100. The idler assembly 100 comprises a pair of brackets 102, 104; a support shaft 106; tie rods 108, 110; a pair of torsion springs 112, 114; a pair of pillow blocks 116, 118 and a paper guide 120. The platen roll 90 is pivotally supported by a carriage 130, which itself is pivotally supported by the support shaft 106.

Figure 3B:
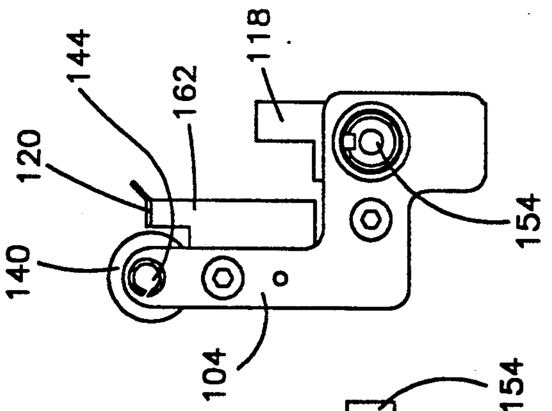
FIG. 3B is an end elevational view of the idler assembly.
Figure 3A:
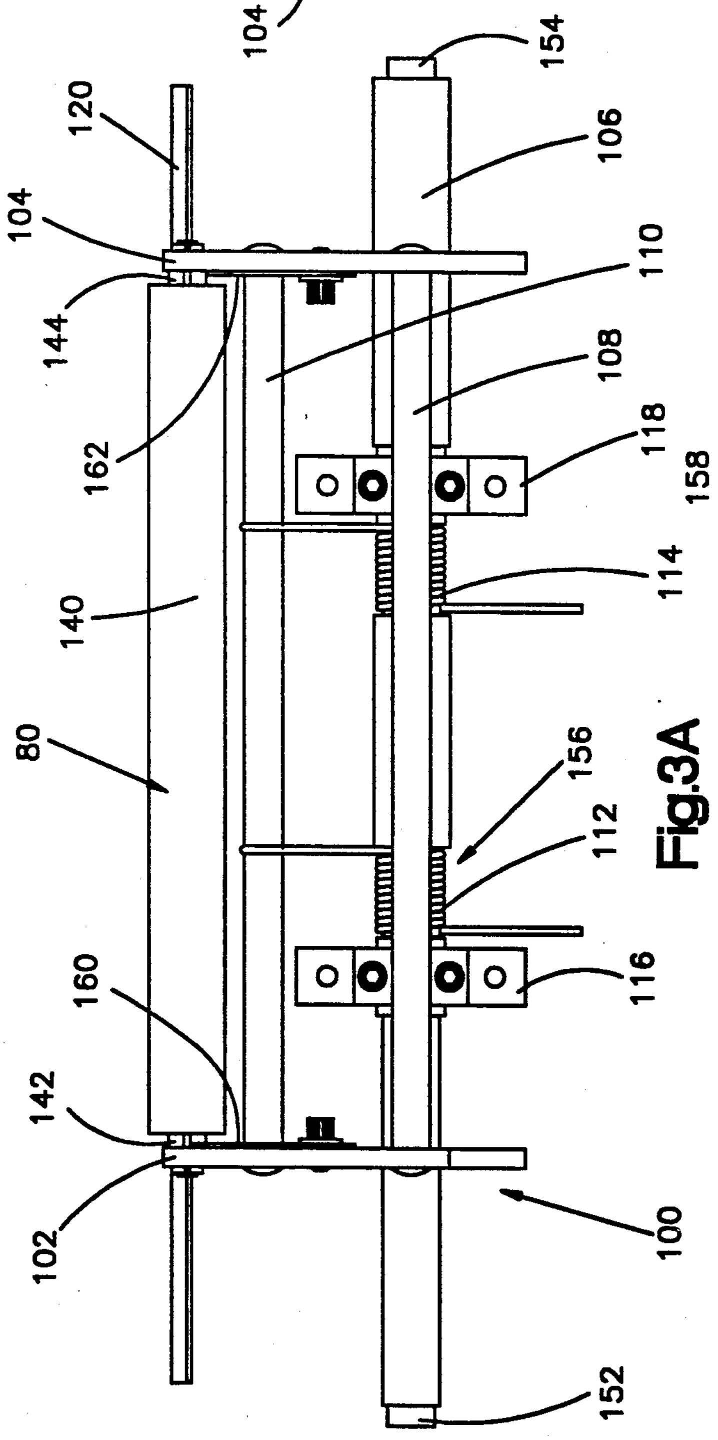
FIG. 3A is a side elevational view of the idler assembly.

The preferred idler roll 80 is composed of aluminum bar stock machined to form a central shaft portion 140 (FIG. 3A) and two reduced-diameter side shaft portions 142, 144. Each of these two reduced-diameter side shaft portions 142, 144 is journaled inside a hole (not shown) passing through one of the brackets 102, 104 to rotatably support the idler roll 80. The central shaft portion 140 of idler roll 80 is machined and anodized for smoothness to provide a small amount of slip when the paper 30 is advanced between the idler roll 80 and the platen roll 90. This small amount of slip interacts with a back pressure applied to the paper upstream of the idler roll 80 to straighten the paper 30 with respect to the print head 40.

The support shaft 106 of the idler assembly 100 is pivotally supported by the pillow blocks 116, 118, which are secured to an inner side wall 150 of the housing 20 by screws. The shaft 106 includes a pair of outer reduced diameter portions 152, 154 and a pair of inner reduced diameter portions 156, 158. The pillow blocks 116, 118 straddle the inner reduced-diameter portions 152, 154. The central coiled sections of the torsion springs 112, 114 encircle the support shaft 106 adjacent the pillow blocks 116, 118. One arm of each of the torsion springs 112, 114 presses against the inner side wall 150 of the housing 20 while the opposite arm of each torsion spring 112, 114 presses against tie rod 110, thereby providing a biasing moment which helps to regulate the pressure between the idler roll 80 and the platen roll 90.

The idler assembly 100 also includes a paper guide 120 which is supported by the brackets 102, 104 via arms 160, 162. The paper guide 120 directs the paper 30 coming through the nip between the idler roll 80 and the platen roll 90 past the print head 40 toward the slit-like opening 26 (FIG. 1) through which printed paper 28 exits the printer 10.

The outer reduced-diameter portions 152, 154 of the support shaft 106 rotatably support the carriage 130. The carriage 130 comprises a pair of plates 170, 172; a shaft 174; a paper guide 176 and a follower 178. The two plates 170, 172 are nearly identical in shape except that the plate 170 has an ear 180 adjacent a lower end which the plate support shaft 106 are keyed at either end in holes 182 (only one shown) near the base of arm portions 184 (only one shown) of the plates 170, 172.

The platen roll 90 is rotatably supported at either end by arm portions 186 (only one shown) of the plates 170, 172. The platen roll 90 comprises a stainless steel rod with a urethane sleeve. The stainless steel rod is machined to form two reduced-diameter side shaft portions (not shown). Each of these two reduced-diameter side shaft portions is journaled inside a hole (not shown) passing through one of the plates 170, 172 to rotatably support the platen roll 90. The inner diameter of the urethane sleeve is sized to fit snugly over the stainless steel shaft while the length of the urethane sleeve is sized so that the ends of the sleeve are approximately flush with the inner ends of the reduced-diameter portions of the stainless steel shaft.

The surface of the urethane sleeve is machined to form a smooth surface which engages the idler roll 80 to form the paper-positioning nip. It is important that the surfaces of the platen roll 90 and the idler roll 80 be uniformly smooth since even microscopic irregularities in the surfaces of the rolls 80, 90 tend to shift the paper off-center as the paper is advanced between the rolls.

The reduced-diameter portion of the platen roll 90 journaled in the plate 170 is coupled to a gear train 190, which is coupled in turn to a stepper motor 192. The stepper motor 192 drives the platen roll 90 to advance the paper 30 across the print head 40. A preferred stepper motor 192 for this application is sold by Airpax Corporation of New York City, N.Y. The motor 192 is supported by the plate 170 by means of a bolt 194 passing through ear 180 and by means of a motor drive shaft (not shown) which is coupled to the gear train 190.

Figure 2B:
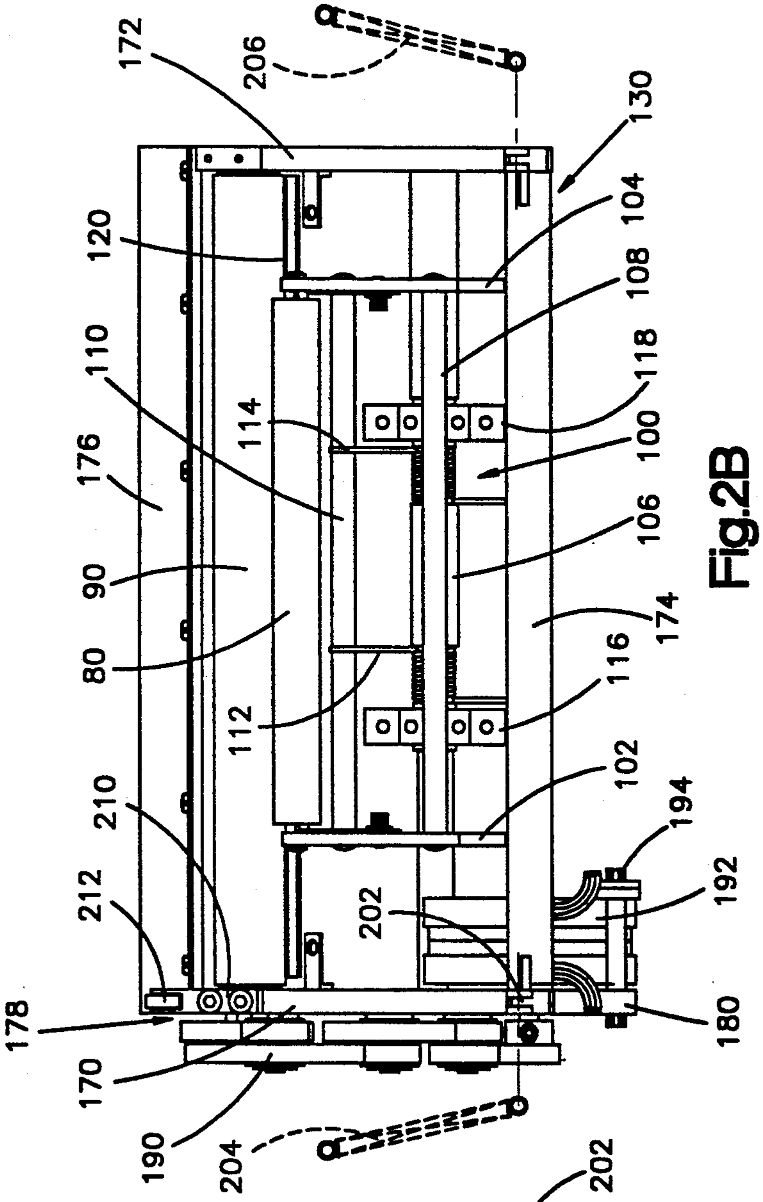
FIG. 2B is a side elevational view of the carriage and an idler assembly showing the positions of the platen roll and idler roll.
Figure 2A:
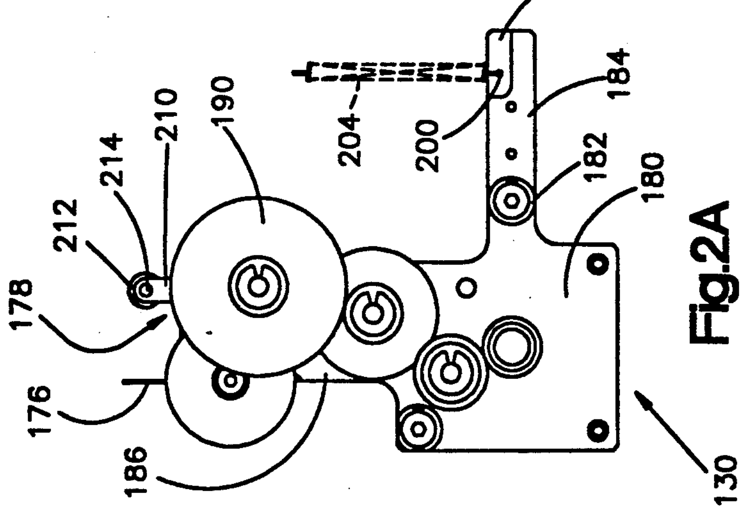
FIG. 2A is an end elevational view of a carriage showing a gear train for driving the platen roll.

The preferred stepper motor 192 includes an internal control system so that the drive shaft (not shown) of the motor 192 advances 7.5° each time it receives a control pulse. The preferred platen roll 90 advances the paper 30 approximately 1/300th of an inch for each control pulse received by the stepper motor 192. Consequently, the gear train 190 must be designed to advance the surface of the platen roll 90 by 1/300th of an inch each time the drive shaft of the stepper motor turns by 7.5°. While the preferred coupling between the stepper motor 192 and the platen roll 90 shown in FIG. 2A is a gear train 190 comprising eight gears, the stepper motor 192 and platen roll 90 could be coupled by different gear trains or by other means such as belts.

Adjacent the outer end of the arm portions 184 of the plate 170, 172 are eyes 200 (only one shown) passing through a reduced thickness portions 202 which serve as means for coupling the plates 170, 172 with springs 204, 206. The ends of the springs 204, 206 opposite the eyes 200 are held by the mandrel roll mounting blocks 60, 70 to generate a biasing force for biasing the platen roll 90 toward the print head 40. The eyes 200 are spaced from the ends of the support shaft 106 so as to form a moment arm with respect to the shaft 106, whose central axis coincides with the pivot axis about which the carriage 130 pivots.

Figure 7:
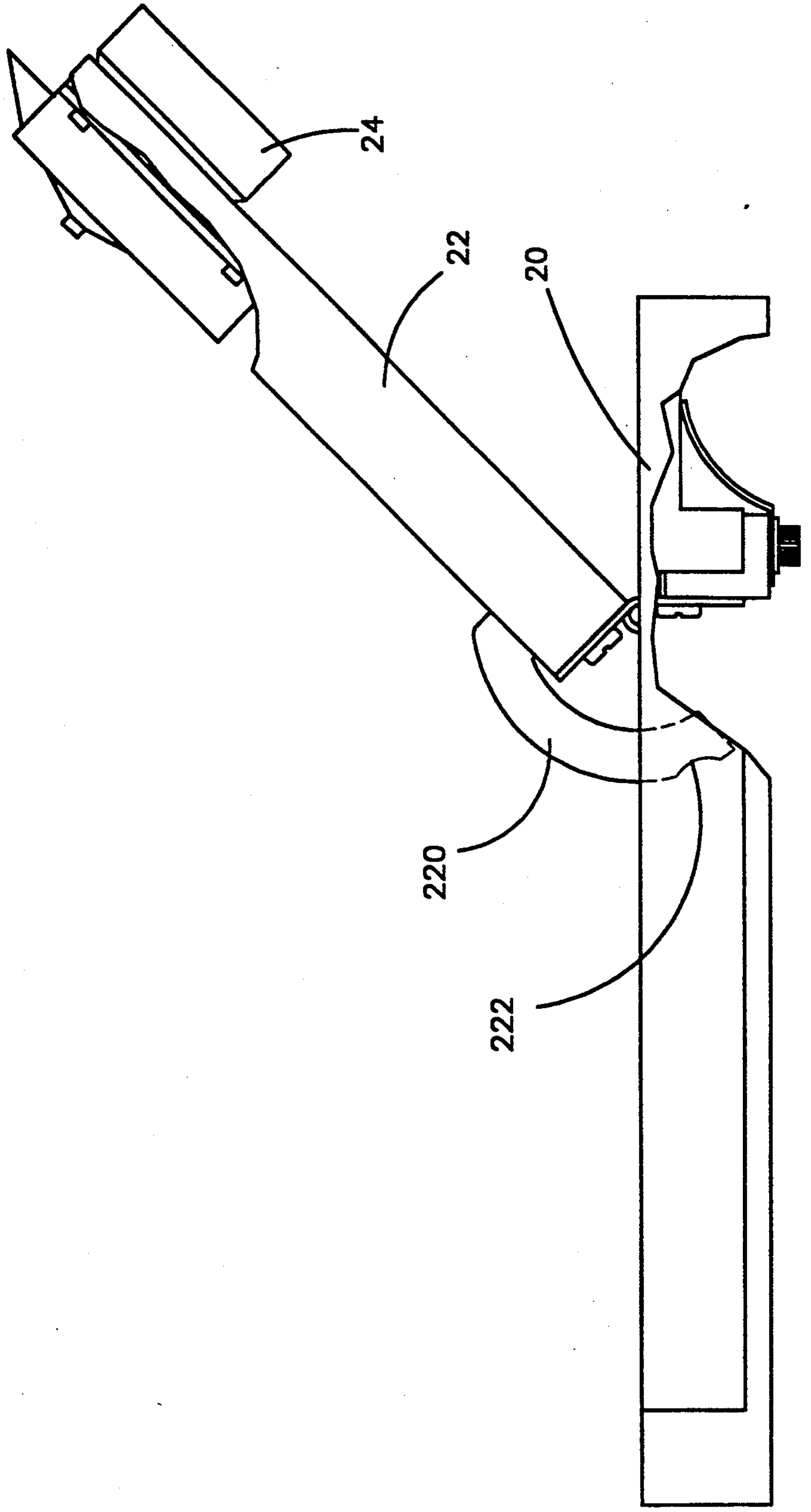
FIG. 7 is a side elevational view of the door showing the cam for restraining the platen roll away from the print head.

A follower 178 is bolted to the outer end of the arm 186 of the plate 170. The follower 178 includes a clevis 210 bolted to the arm portion 186 adjacent the gear train 190 and a roller 212 which is supported by an axle 214 supported by the clevis 210. The roller 212 defines a following surface 216 which, when the door 22 is open, abuts a cam 220 (FIGS. 7, 8A) fixed at one end to the underside of the door 22 when the door 22 is open. The cam 220 is essentially circular in profile, with a circular notch 222 cut into the surface near the free end of the cam 220. The biasing force which the springs 204, 206 exert against the arm portions 184 tends to press the follower surface 216 of the roller 212 against the surface of the cam 220 when the door 22 is open so that the cam 220 restrains the motion of the carriage 130. The door 22 acts as a lever which causes the cam 220 to move relative to the follower 178.

Figure 8B:
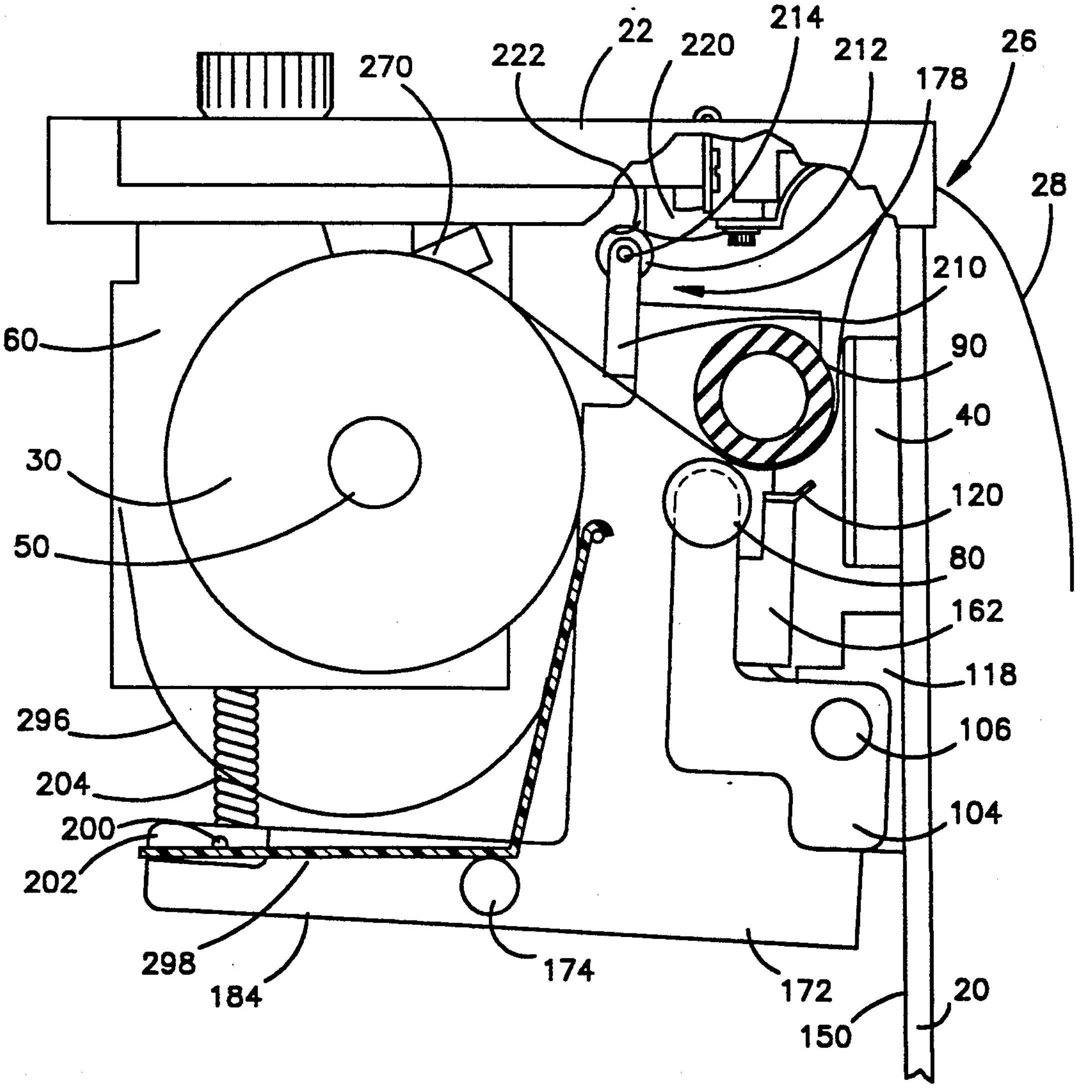

When the door 22 is open (FIG. 8B), the roller 212 abuts the cam 220 and moves into the circular notch 222 in the cam 220. The abutment of the roller 212 with the cam 220 restrains the arm portions 186 and the platen roll 90 away from the print head 40, while the engagement of the roller 212 with the circular notch 222 helps to hold the door 22 open. Closing the door 22 (as in FIG. 8A) rotates the cam 220 so that the roller 212 moves out of the circular notch 222 and away from the cam 220. Since the cam 220 no longer limits the motion of the carriage 130, the action of the springs 204, 206 rotates the carriage 130 and presses the platen roll 90 against the paper 30, which is thereby held between the platen roll 90 and print head 40.

The mandrel roll 50 (FIG. 6), which consists of a central portion 230 and two reduced diameter side axle portion 232, 234, supports the roll of paper from inside the hollow core over which the roll of paper is wrapped. The two reduced diameter side axle portions 232, 234 are rotatably supported by mandrel roll mounting blocks 60, 70, which are themselves bolted to inner side walls 236, 238 of the printer housing 20.

Figure 5:
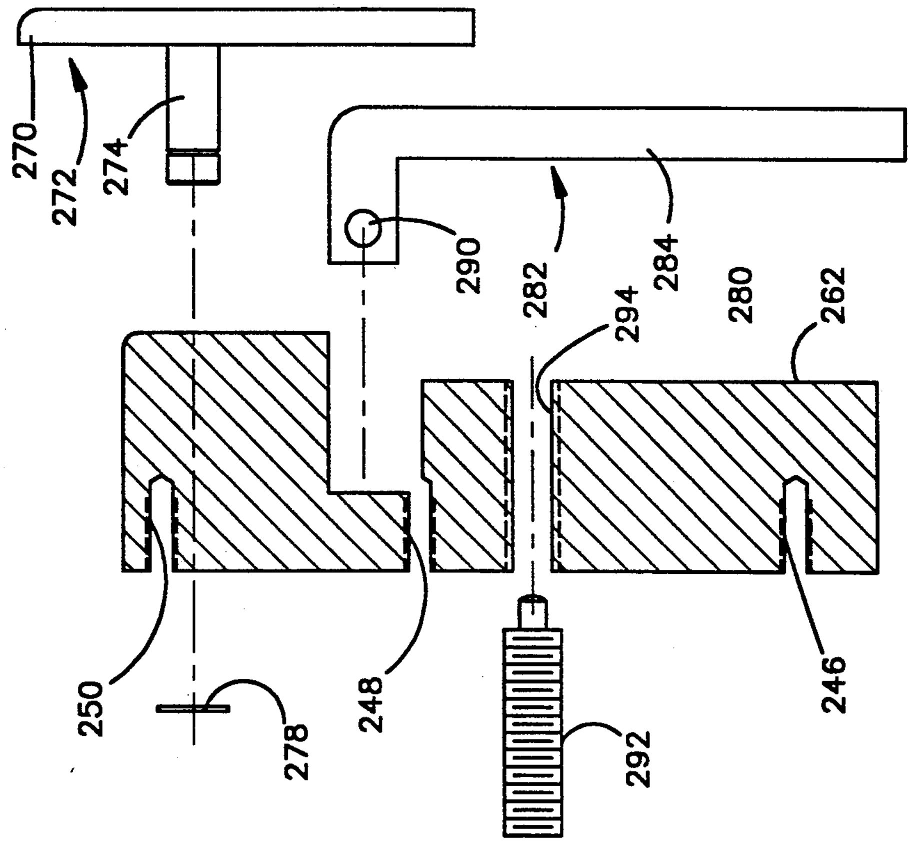
FIG. 5 is a schematic disassembled view of a braking mechanism for applying a back pressure to the paper roll.
Figure 4:
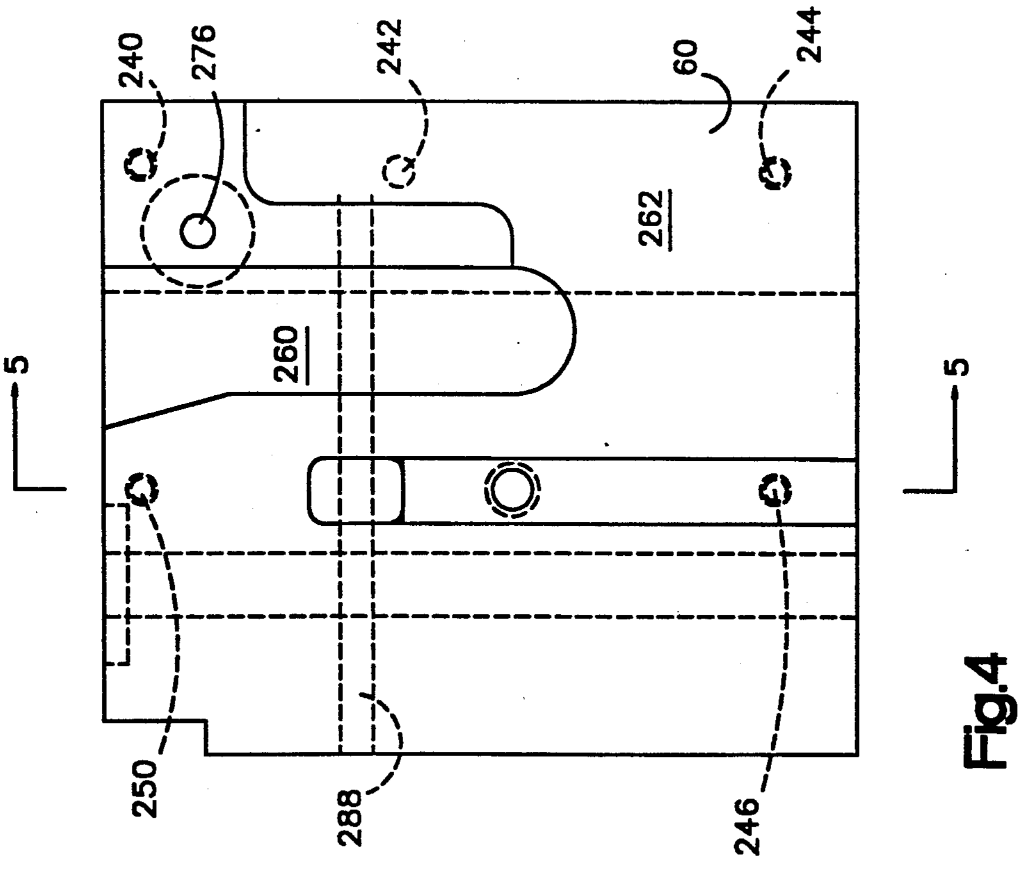
FIG. 4 is a side elevational view of a mounting block for supporting the mandrel roll.

The preferred mandrel roll mounting block 60 (FIGS. 4, 5) is a one-piece TEFLON-coated plastic block which is fixed to the inner side wall 236 (FIG. 6) of the housing 20 by means of bolts threaded into bolt receiving bores 240, 242, 244, 246, 248, 250, 252. The mounting block 60 includes a recess 260 in its front face 262 for rotatably supporting the reduced diameter side axle portion 232 of the mandrel roll 50. (The opposed mandrel roll supporting block 70 has an identical opposed recess for rotatably supporting the reduced diameter side axle portion 234 of the mandrel roll 50.) The recess 260 opens at the top surface of the mandrel roll support block 60, as at 264, so that the mandrel roll 50 can be slid into the recess 260 from the top.

The recess 260 is partially covered by a lever portion 270 of a mandrel roll securing structure 272. The mandrel roll securing structure 272 is held in place by a rod portion 274 which passes through a bore 276 in the mandrel roll mounting block 60, and is retained by a retaining ring 278 at the back of the mounting block 60. The top of the lever portion 270 extends above the top of the mandrel roll mounting block 60 for contact with the underside of the door 22. When the door 22 is open, the lever portion 270 is aligned vertically to permit the operator to drop the reduced diameter side axle portion 232 into the recess 260 in the mandrel roll mounting block 60. As the door 22 is closed, the underside of the door 22 contacts the top of the lever portion 270 and rotates the lever portion 270 about the axis of the rod portion 274 so that the bottom of the lever portion 270 retards the upward movement of the reduced diameter side axle portion 232 of the mandrel roll 60. In this blocking position, the lever portion 270 retards the mandrel roll 60 from moving upwardly out of the recess 260 and reduces the movement of the mandrel roll 60 when the printer 10 is shaken.

The mandrel roll mounting block 60 also includes an "L"-shaped recess 280 for receiving an "L"-shaped braking arm 282. The braking 282 is pivotally supported in the recess 280 so that a lower portion 284 moves in and out of the recess 280. The arm 282 is supported by means of an axle 286 which is positioned in a receiving bore 288 in the mounting block 60 such that the axle 286 passes through an eye 290 in the arm 282 when the arm is located in the "L"-shaped recess 280.

A spring plunger 292 (a structure having a threaded outer casing and a plunger restrained to move linearly in the casing under the effect of a spring) is mounted in a threaded bore 294 located behind the braking arm 282 such that a plunger portion 296 of the spring plunger 294 abuts the lower portion 284 of the arm 282 to bias the lower portion 284 out of the recess 280. When a roll of paper is supported by the mandrel roll 50 between the mandrel roll supporting blocks 60, 70, the spring plunger 292 biases the lower portion 284 of the braking arm 292 against the hollow core and rolled paper, preferably against the hollow core alone, to provide a back pressure which creates a tension as paper is drawn off the core by the rotation of the platen roll 90.

A new roll of paper is added by sliding the roll of paper over the mandrel roll 50; dropping the mandrel roll 50 between the mandrel roll supporting blocks 60, 70; positioning the end of the paper 30 in the nip between the platen roll 90 and idler roll 80; signaling the stepper motor 192 to advance the end of the paper 30 past the print head 40 and out through the slot 26 in the housing 20 and closing the door 22. The stepper motor 192 turns the platen roll 90 to drive the paper 30 through the nip between the rolls 80, 90 against the paper guide 120 which directs the paper 30 toward the print head 40. The paper 30 passes through the gap between the platen roll 90 and the print head 40, and is then directed out of the printer housing 20 through the slot 26. As the paper 30 is unrolled from the roll, the back pressure applied by the arm 282 to the core of the paper roll causes the paper 30 to align itself relative to the print head 40.

The housing 20 is designed for compactness in order to minimize the space which the printer 10 occupies in a cockpit. As a result, the preferred housing leaves only enough room for a full roll of paper 30 to be inserted on the mandrel roll 50. If an operator wishes to remove a full roll of paper 30 from the printer, there is not enough room for the operator's hand to grasp the roll. Instead, a pull tab 296 comprising a film of plastic is bonded to a guard 298 coupled to the inside of the housing 20. In order to remove a full roll of paper, the operator can pull upwardly on the pull tab 296, which lifts the mandrel roll 50 and paper 30 upwardly away from the mandrel roll support blocks 60, 70 and out of the housing 20.

The preferred printer 10 is mounted in an airplane cockpit by means of rails (not shown) which are coupled to matching rails in the cockpit by means of bayonet-type fasteners, in a manner familiar to those skilled in the art.

PRINTER CIRCUITRY

Figure 9:
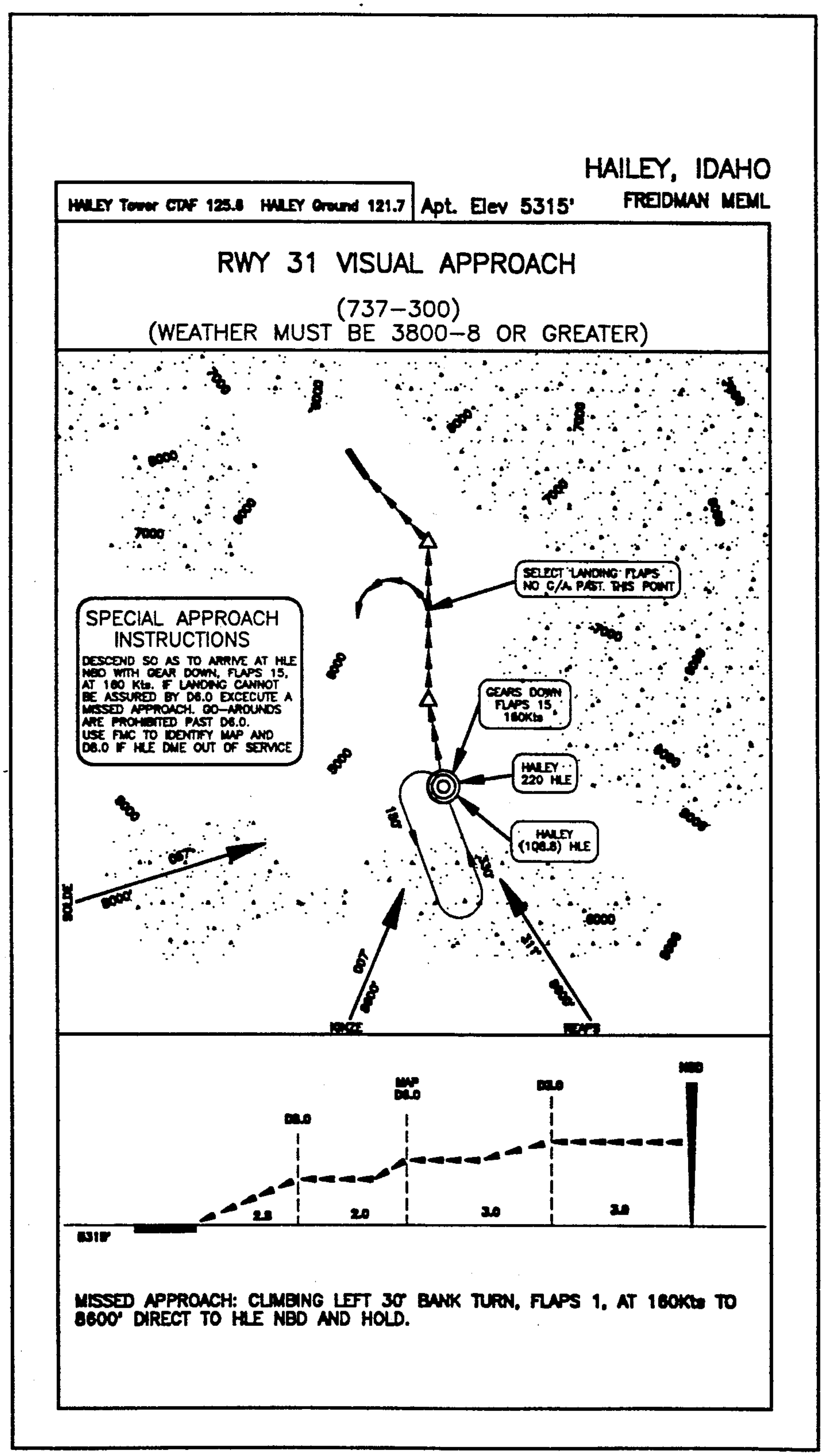
FIG. 9 is a schematic view of an aerial map.
Figure 10:
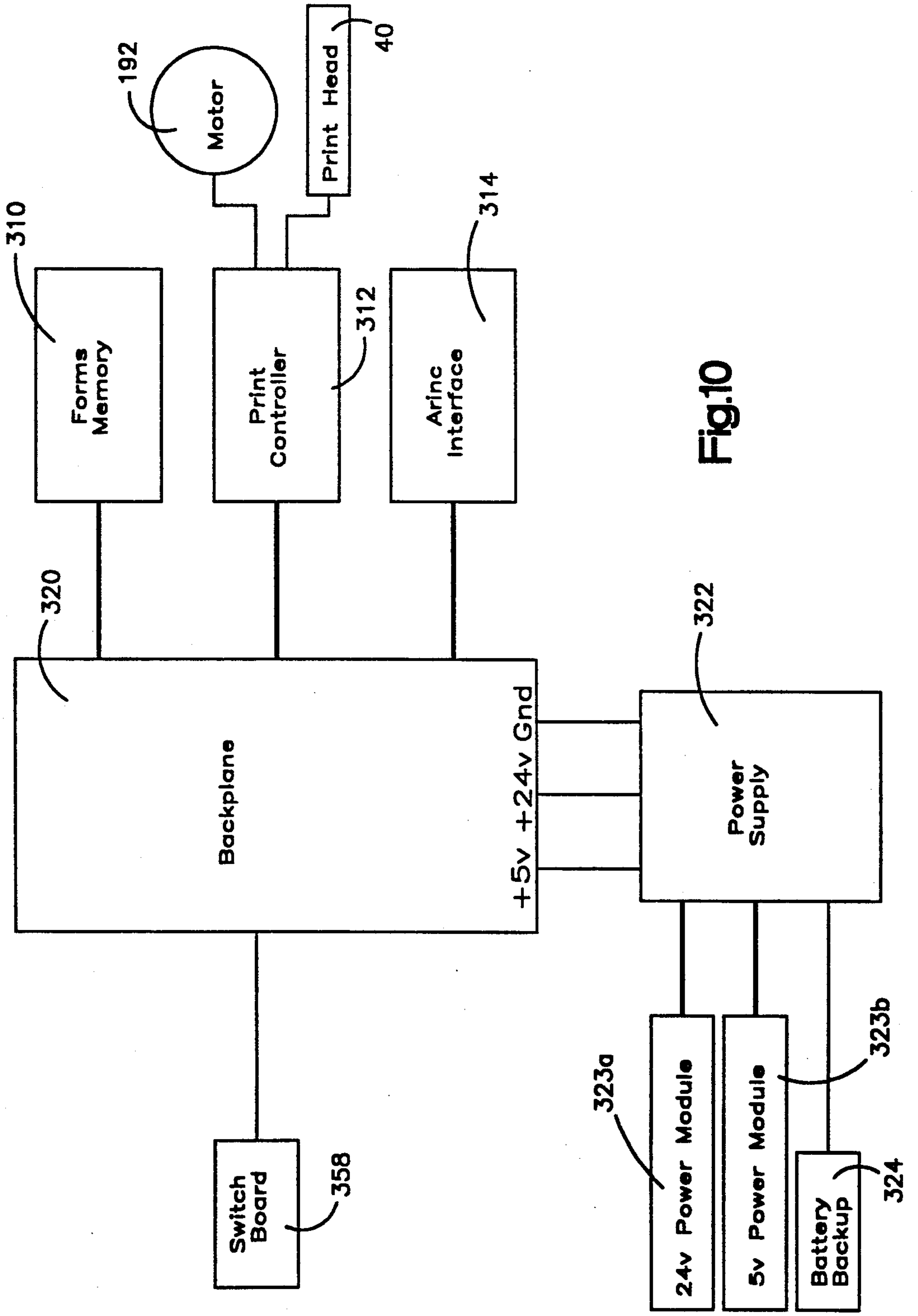
FIG. 10 is an overall block diagram of the electronic controls of the system.

FIG. 10 is a block diagram of a control system 300 for synchronizing activation of the printhead 40 and stepper motor 192 to create a hard copy image 302 such as the image depicted in FIG. 9. Three circuit boards 310, 312, 314 support programmable controllers and support circuitry for printing data by controlled activation of 2592 linearly arranged print elements contained within the printhead 40. The three circuit boards 310, 312, 314 are connected to a backplane connector that supports the boards 310, 312, 314 within the printer housing 20 and routes communications signals back and forth between the programmable controllers along a SCSI bus 320.

A power supply circuit 322 energizes the circuits via the bus 320 by providing 24-volt and 5-volt signals with respect to a ground or reference potential. The power supply 322 receives a 115-volt 400 hertz A.C. signal from the airplane electrical system. This signal is rectified and coupled to 24-volt and 5-volt power modules 323*a*, 323*b* within the supply 322 to provide the +5 and +24 volt signals. In the event of a failure in the airplane power system, a battery back-up module 324 energizes the volatile memory. This allows a print job interrupted by a power failure to be reinstituted upon the re-establishment of power.

Figure 13:
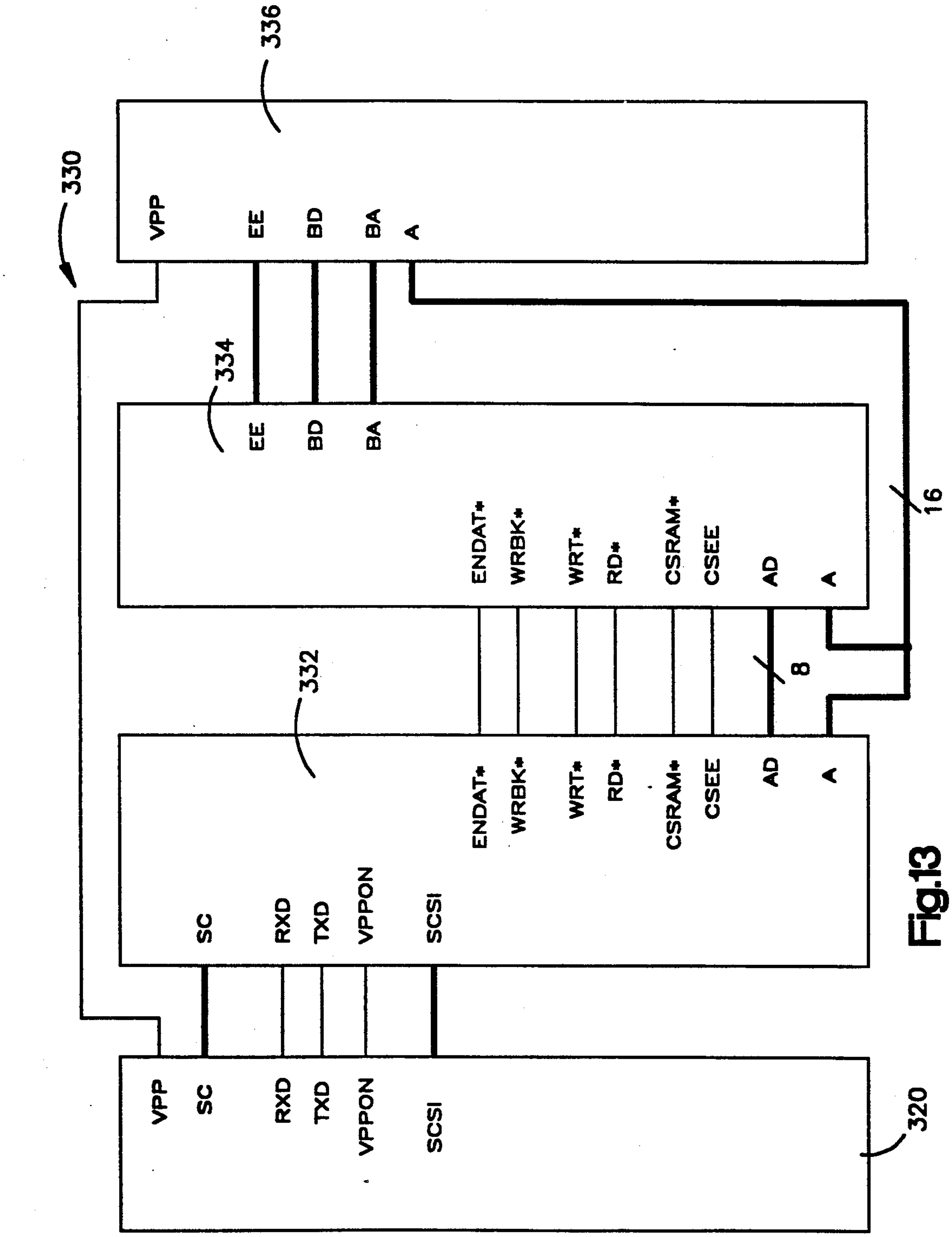
FIG. 13 is a schematic diagram of a memory for storing static and variable data for use by the printer.

Each of the circuit boards 310, 312, 314 supports circuitry to perform a subtask in activating the printhead 40 and the stepper motor 192. A forms memory circuit 330 (FIG. 13) is supported on the circuit board 310. The forms memory circuit includes a microprocessor 332 and memory circuits 334, 336 for storing data. Non-volatile data is stored in an $E^2$ROM forms memory circuit 336. The principal function of the microprocessor 332 is to manage the contents of the memory circuit 336.

Figure 11A:
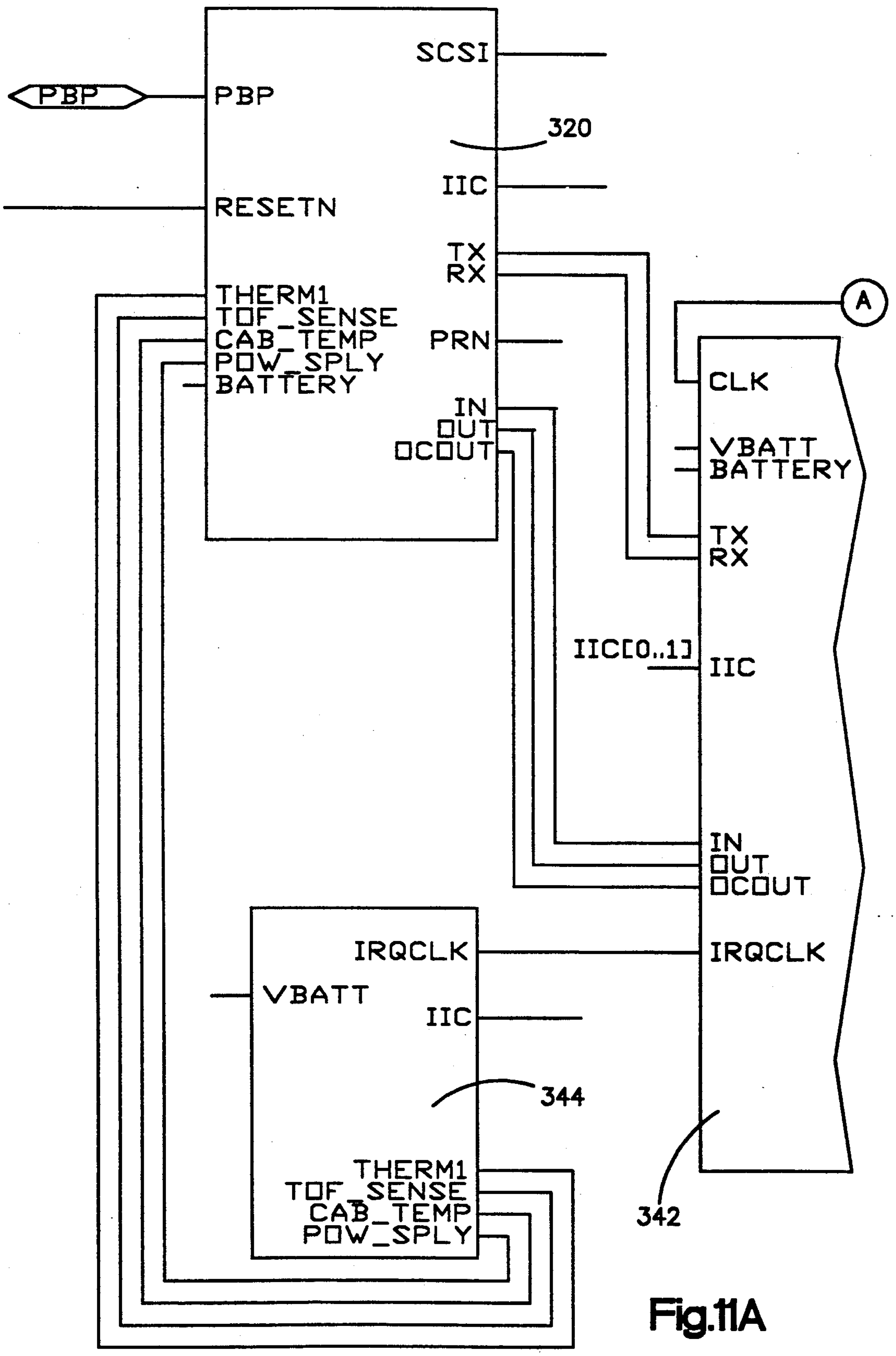
FIGS. 11A and 11B is a schematic diagram of a control mechanism for the print head.
Figure 11B:
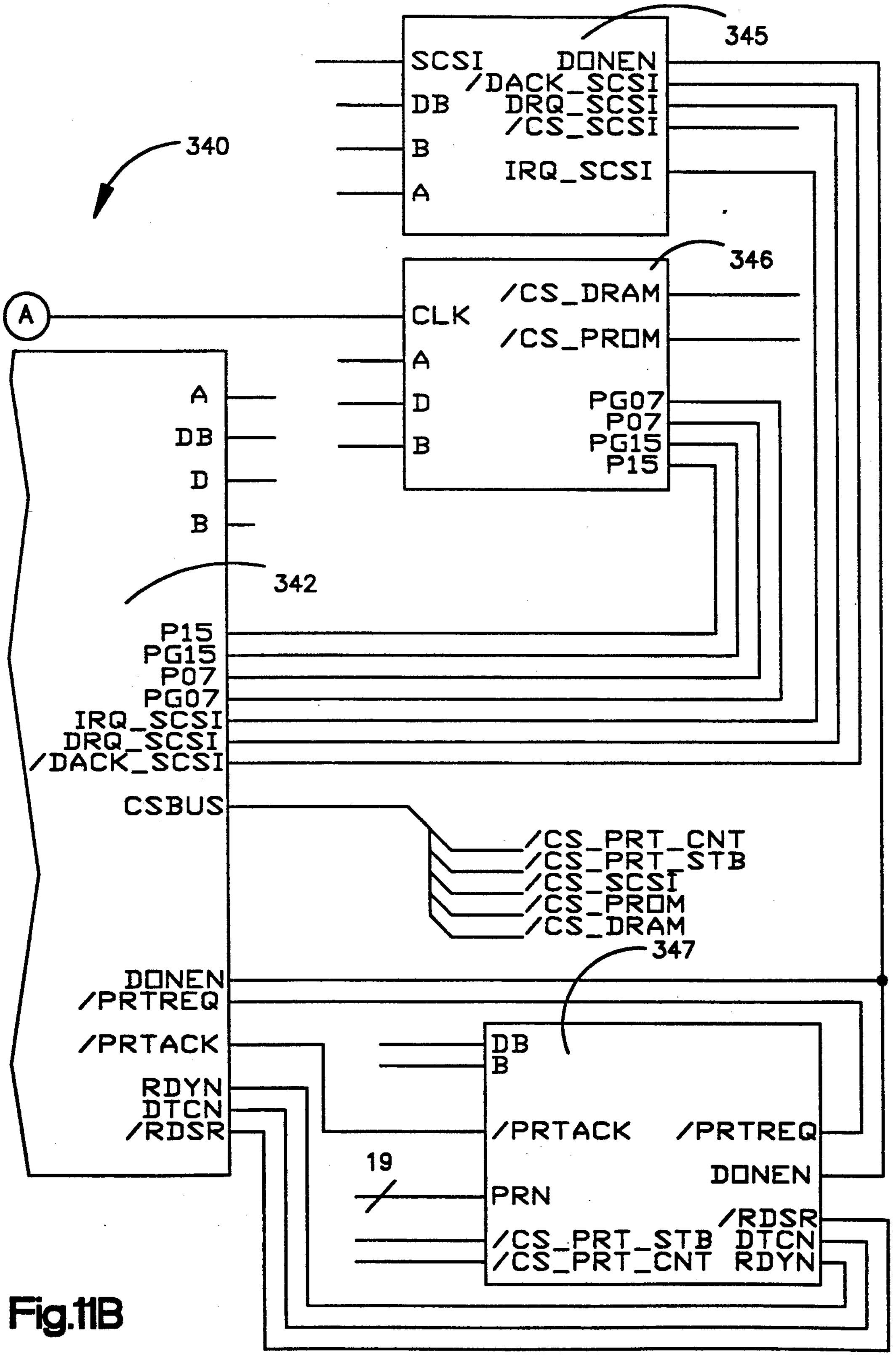

The second printed circuit board 312 supports a printer control circuit 340 (FIGS. 11A and 11B) having a microprocessor 342 and circuits 344–347 for interfacing with the print head, stepper motor and SCSI bus 320. The print controller microprocessor 342 is responsible for formatting data and loading it into a shift register in a printhead interface circuit 347.

The third circuit board 314 supports a communications circuit 350 which also includes its own microprocessor 352 and communications transceiver circuits 354, 356 for sending and receiving information to and from the microprocessor 352.

Each of the microprocessors 322, 342, 352 communicates by means of a SCSI interface managed by a separate SCSI controller on each of the printed circuit boards 310, 312, 314. When power from the airplane power subsystem is applied to the printer, each of the microprocessors, 332, 342, 352 executes a start-up routine. The forms memory and print controller microprocessors enter an idle state awaiting communications from the communications microprocessor 352. In response to receipt of a message, the communications microprocessor 352 signals the print controller and forms memory microprocessors via a first SCSI interface circuit 360 connected to the bus 320.

Figure 12:
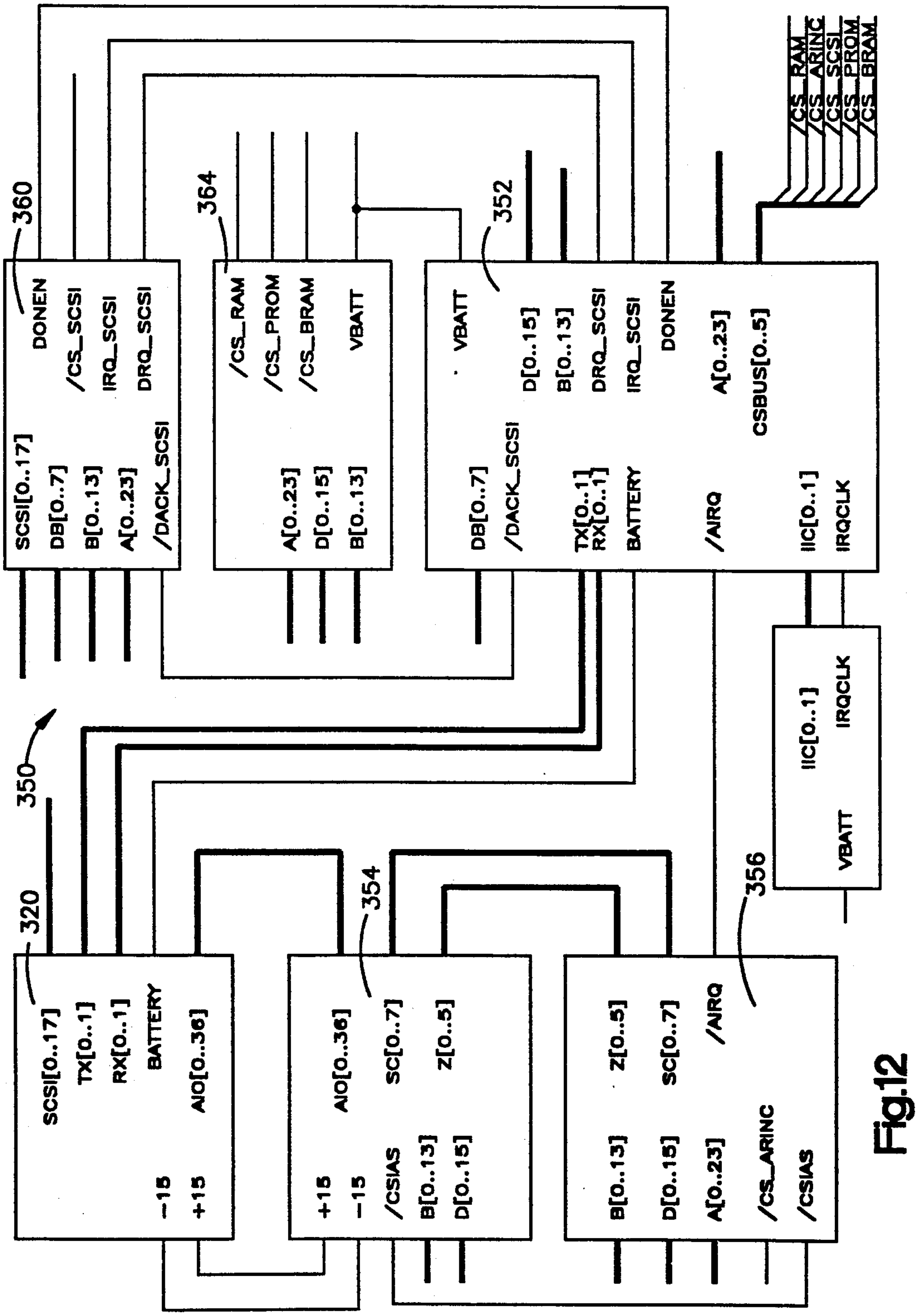
FIG. 12 is a schematic diagram of a receiver for receiving variable data from a remote source.

FIG. 12 schematically depicts the components of the communications circuit 350. A preferred microprocessor 352 comprises a Philips 68070 microprocessor having pins to define a 24-bit address bus (A), a 16-bit data bus (D), and a 14-bit control bus (B). Timing signals for the microprocessor 352 are provided by an oscillator at a clock rate of 20 megahertz. The microprocessor 352 executes a control algorithm for receiving data from a ground transmission by means of the transceiver circuit 354. The transceiver circuit 354 is coupled to a control circuit 356 that includes a commercially available integrated circuit for implementing the ARINC communications protocol. Upon receipt of a message, the microprocessor 352 receives a request to transmit data from the ARINC communications controller 356 which places the received data on the data bus so that it can be stored within a random access memory portion of a memory circuit 364 attached to the microprocessor controller 352. Once an entire message has been received via the transceiver and ARINC controller circuits 354, 356, the microprocessor 352 can communicate the message to the other microprocessors 332, 342.

The ARINC microprocessor 352 arranges by means of a SCSI controller 360 to gain access of the bus and transmit data. Once control of the data bus is obtained, the microprocessor 352 can transmit a received message from the microprocessor memory 364 onto the bus so that this message can be interpreted by the microprocessor 342 contained on the printed circuit board 312. This microprocessor 342 interprets the received message and formulates a bit map image based upon the received message from data received by the transceivers as well as data stored within the non-volatile memory 336 of the forms memory circuit 334.

Turning now to FIG. 9, a typical output from the printer 10 is depicted showing a landing approach to an airport having an elevation of 5,315 feet. The chosen flight path is determined based upon weather conditions as well as the physical layout of the airport and its environment. The flight path is transmitted from a ground transmitter and superimposed upon a map showing fixed data describing the physical layout of the airport. In order to superimpose the flight path onto the fixed data, the microprocessor 342 must compose a composite image from fixed and variable data. In accordance with a preferred technique for providing a composite image, the microprocessor 342 composes the image and stores it in a memory 346 before it is extracted and loaded into the printhead 40.

One example of the fixed data is data describing the physical make-up of the landing site, and also data used in generating graphic images on the printer output. As an example, the arrows on the representative print-out in FIG. 9 can be stored in memory. The command message from the ground communications transmitter need, therefore, only indicate that an arrow need placed at a particular location and a particular orientation. This message is received from the transceiver circuit 354 and stored within the memory 364. When it is transmitted to the microprocessor 342 for use in composing an image, the data at a particular memory location can be "ORed" with the data for creating an arrow at a particular location on the orientation. Stated another way, fixed data describing the airport physical layout can be first loaded into the memory 346. The microprocessor 342 can then access the variable data in the form of a message stream from the transceiver and superimpose this variable data by extracting a bit map for the data and correctly placing it within the memory 346.

Once a complete image has been composed, typically including text, graphical images and weather information, the memory is accessed in a sequential fashion by the microprocessor and a serial shift register loaded a line at a time. Once a particular line of data has been loaded, a command is sent to the printhead to fire the print elements and the next print line loaded into the shift register.

Figure 14:
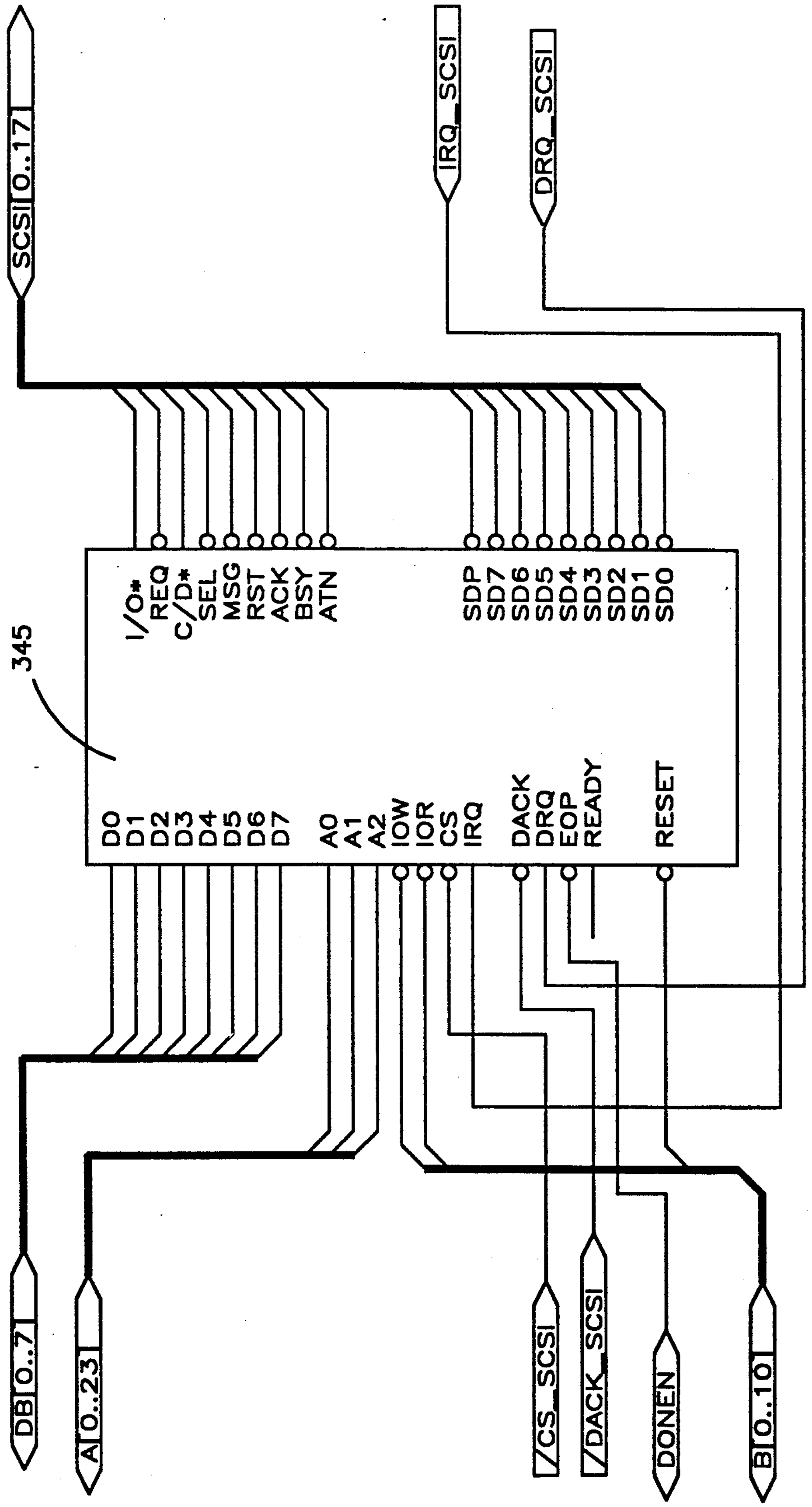
FIG. 14 is an interface for transferring information inside the printer.
Figure 15A:
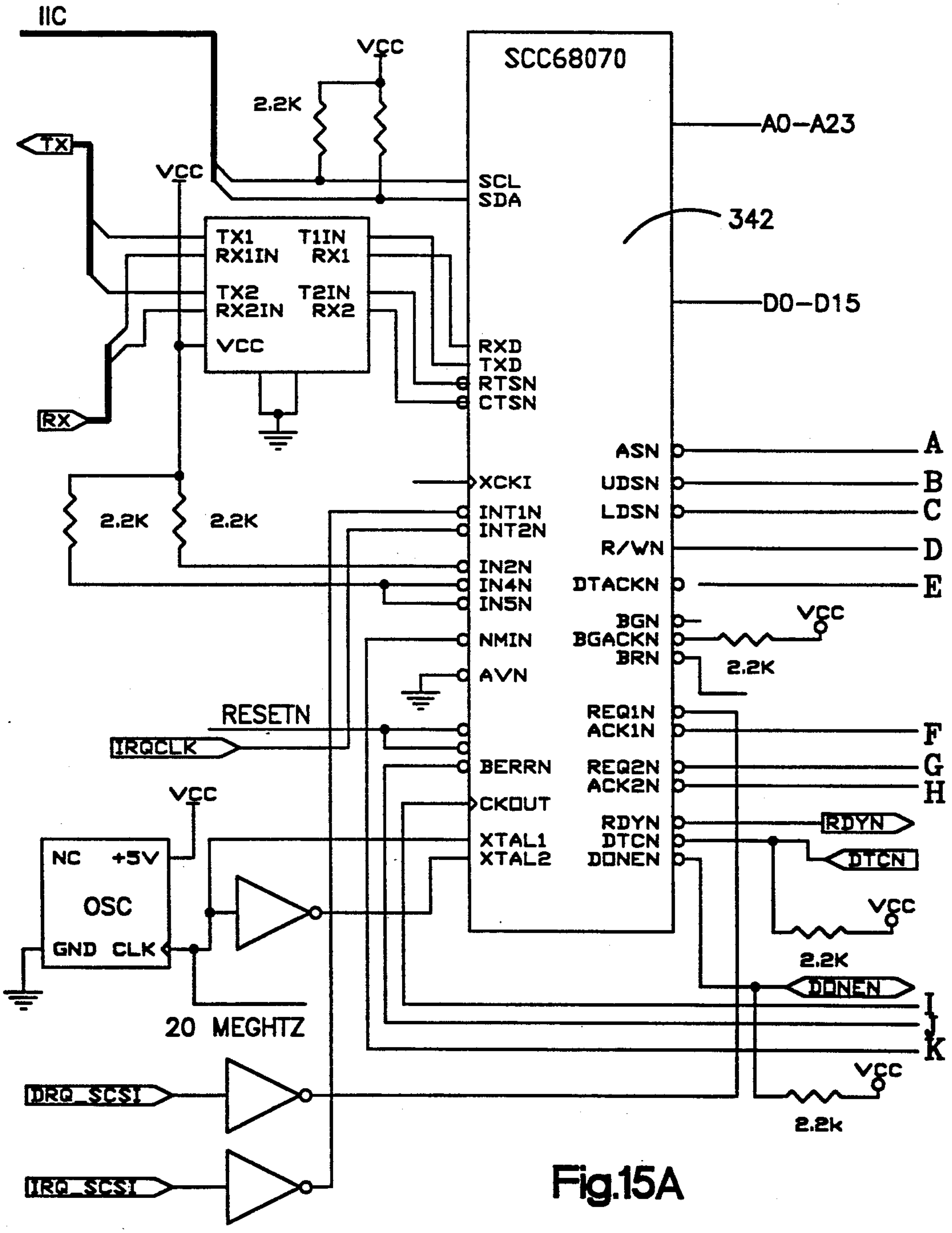
FIGS. 15A and 15B are a schematic diagram of a processing unit for the printer control.
Figure 15B:
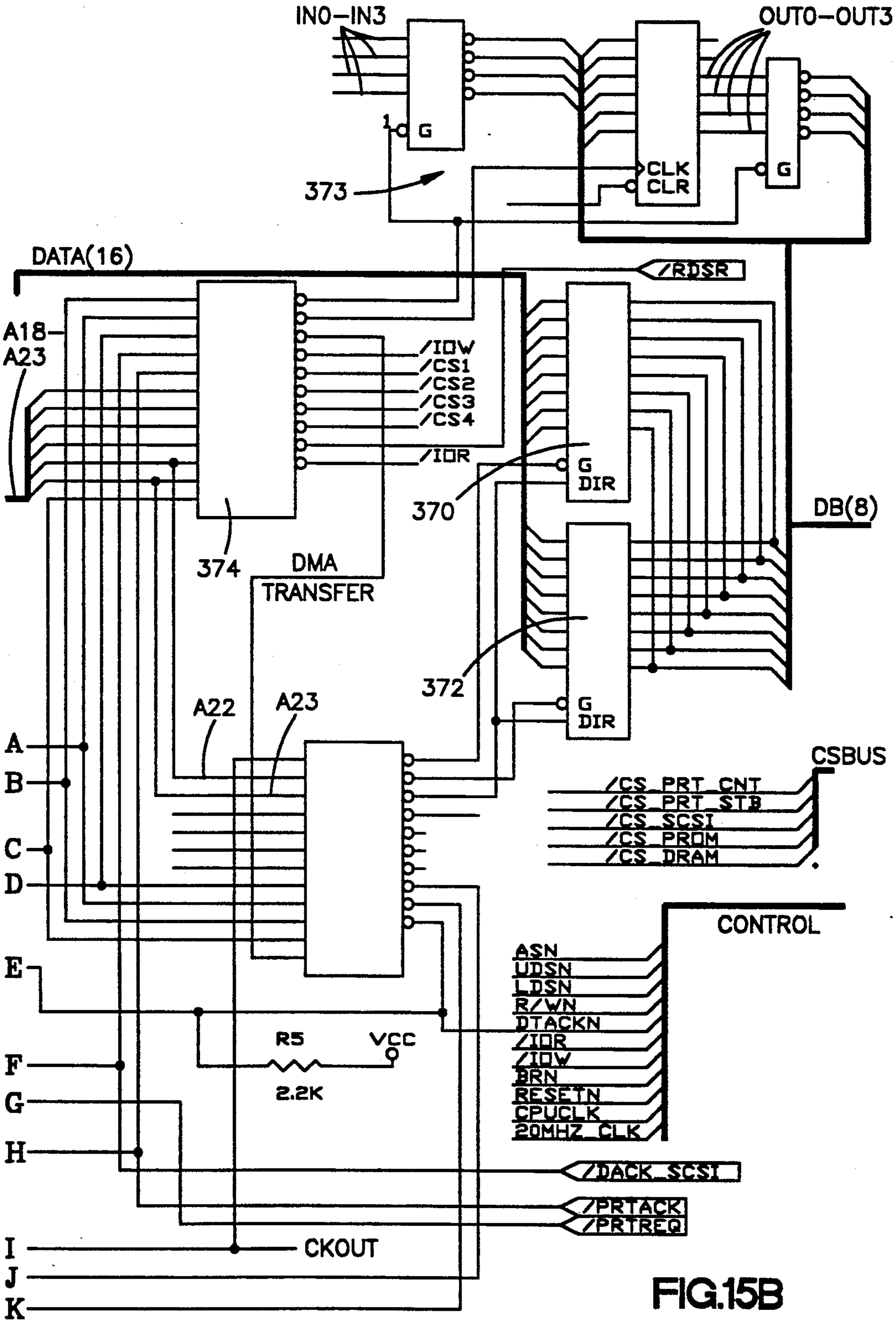

FIGS. 15A and 15B present a detailed schematic of the microprocessor 342 and support circuitry coupled to the microprocessor. The SCSI interface 345 mounted to the printed circuit board 312 is depicted in detail in FIG. 14. Under the present SCSI standard published by the IEEE, the SCSI interface is capable of transmitting data in 8 parallel bits, so that an 8-bit data bus DB is depicted in FIG. 14. The microprocessor 342, however, is capable of outputting 16 parallel bits of data. When communicating data with the SCSI interface 345, therefore, two bi-directional latch circuits 370, 372 convert the 16-bit data to 8 bits and vice versa. To transmit a 16-bit piece of information from memory on one circuit board to the other, therefore, the 16 bits must be broken up into two 8-bit transmissions and reconstructed at the receiving end of the data communications.

The 8-bit bus DB also transmits data to and receives data from a user interface circuit 373 (FIG. 15B). This circuit receives inputs from user actuable switches positioned next to the housing door 22 (see FIG. 1). Signals for activating LEDs next to the user actuable switches are also routed via the bus DB to the interface 273.

During loading of the printhead data, the microprocessor 342 calculates the beginning address of a row of data and transmits this beginning address and an indication of how many bytes should be transferred to a DMA transfer control circuit 374. The DMA transfer control circuit is then given control of the data bus to transmit data from memory to the printhead by the 8 bit data bus DB. Since the memory 346 has been organized to include a bit mapped image to be printed, it is sufficient to instruct the DMA controller the beginning memory location of a line and how many bytes of information are to be loaded into the printhead serial shift register. The DMA controller then takes control of the data bus presenting the appropriate data to the latches 370, 372 and activating those latches in alternate fashion to present 8-bit data bytes to the print control circuit 347 which converts this data into serial bits and sends the bits to the shift register of the printhead 40. Appendix A is a "C" language listing of a function for printing a line of data from the memory 346 that has been formatted based upon a received message.

Figure 16:
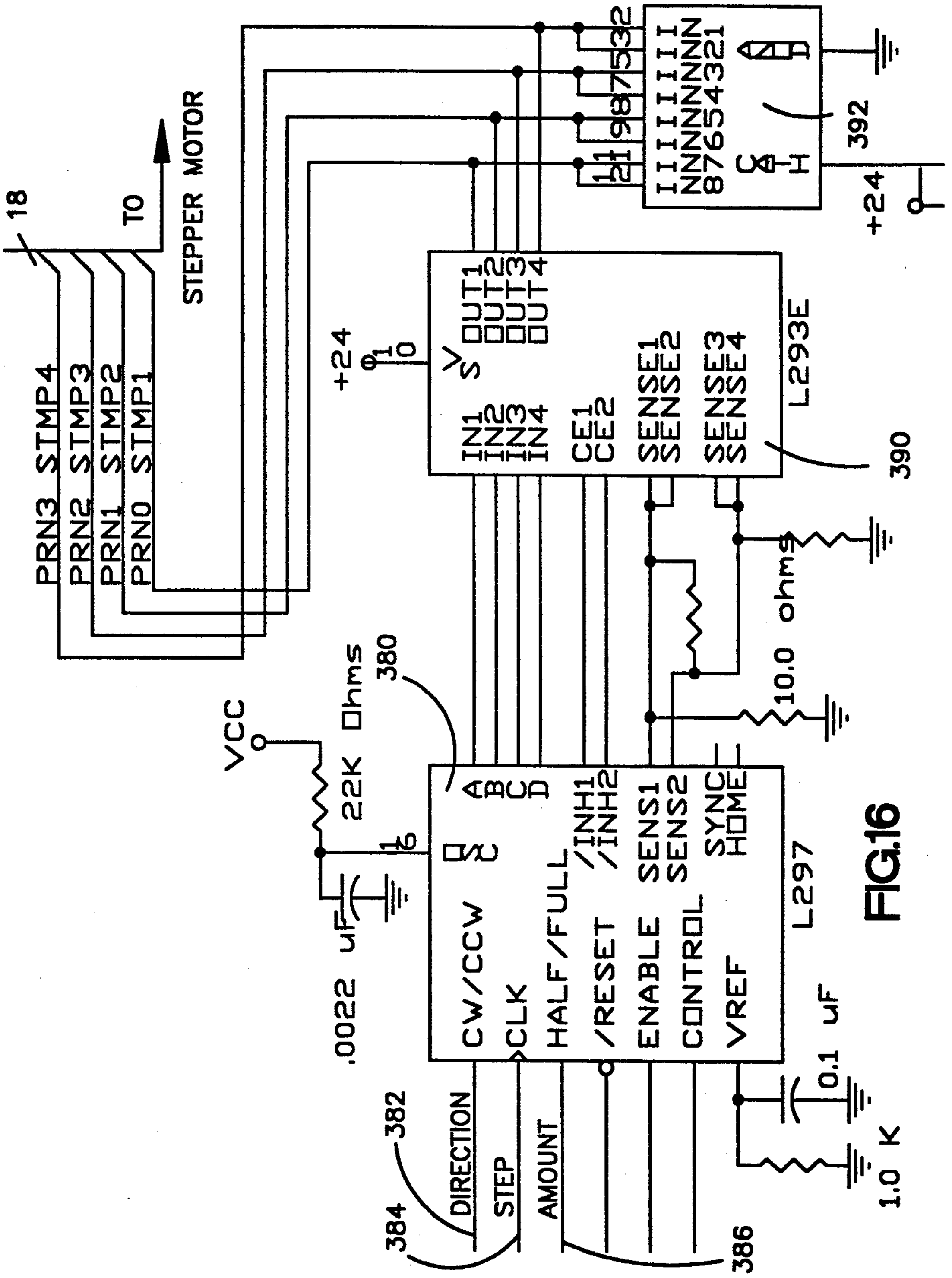
FIG. 16 is a detailed schematic of a portion of the FIG. 11 diagram for activating a printer stepper motor for advancing paper past the printhead.

FIG. 16 depicts a portion of the circuit 347 that activates the stepper motor 192. A stepper motor controller 380 receives control inputs from a latch (not shown) that interfaces the data bus DB. A direction input 382 to the controller 380 controls the direction of paper movement. A step input 384 clocks the stepper motor in the direction dictated by the input 382. An amount input 386 dictates the angular displacement for each incremental stepper motor activation.

Outputs from the controller 380 are coupled to a drive circuit 390 having power transistors for activating the stepper motor. A diode array 392 coupled to outputs to the stepper motor prevents voltage spikes generated from the stepper motor from reaching the drive circuit 390.

FORMS MEMORY

The forms memory 336 permits the placement of a background image underneath uplinked information and also permits the storage and loading of executable routines into the microprocessor 342. A message sent from a ground station can contain a unique code sequence that specifies a particular background or form to be laid in place prior to placing textual information in a memory buffer for printout. This code specifies a particular 'file' or entity with which to merge the uplinked ASCII information. Secondly, multiple files, representing objects can be called up simultaneously to permit merging multiple backgrounds prior to placement of text.

Printing information using the forms concept requires coordination of the incoming ascii data stream and the form decoder/ascii encoder. When the printer is used as a standard ascii character display, the printer can be considered stateless - it needs only a line of data in order to invoke a visible response. When the user decides to uplink a message that involves the use of a form or forms, this is not the case. Rather than acting as a line-by-line printer, the printer switches to a state-driven page printer. The difference between a line printer and a page printer is only the volume of information printed in sequence. A line typically occupies 1/66th of the page and is self contained; no additional or dependent data is required to complete the activity of placing dots on the paper for that line. In the page scenario, however, information is merged from a number of sources and therefore cannot actually print until all information associated with this page has been collected and processed. Since the page cannot begin to print until this occurs, there may be a delay before printing actually begins. The amount of delay is dependent on the complexity of the information transmitted and contained in the form(s).

Sending a forms request (merge form with incoming data stream) causes the printer to interpret the data stream based on the form specified. Upon initial receipt of the form fetch command sequence, the print controller 342 sends a 'form open for read' command to the forms memory CPU 332. If this command is unsuccessful, the CPU causes a header line is displayed on the sheet of printed material to indicate indicate an error condition has occurred. Upon successfully opening a form file, the attributes of are examined by the microprocessor 342 to insure proper nature of the file (printable versus executable) and determine the necessary resources (memory required to store the form). A 'form read' is then sent to the forms memory microprocessor 332 and the form data is read into a buffer in the print controller. Depending on the format of the form, a decoding or interpretation routine is called to expand the form into a page-sized bit map. Uplinked information (either text or graphic primitives) are then converted by the microprocessor 342 to bit positions within the form and placed on top of the background.

FORMS FLOW CHART

Figure 17:
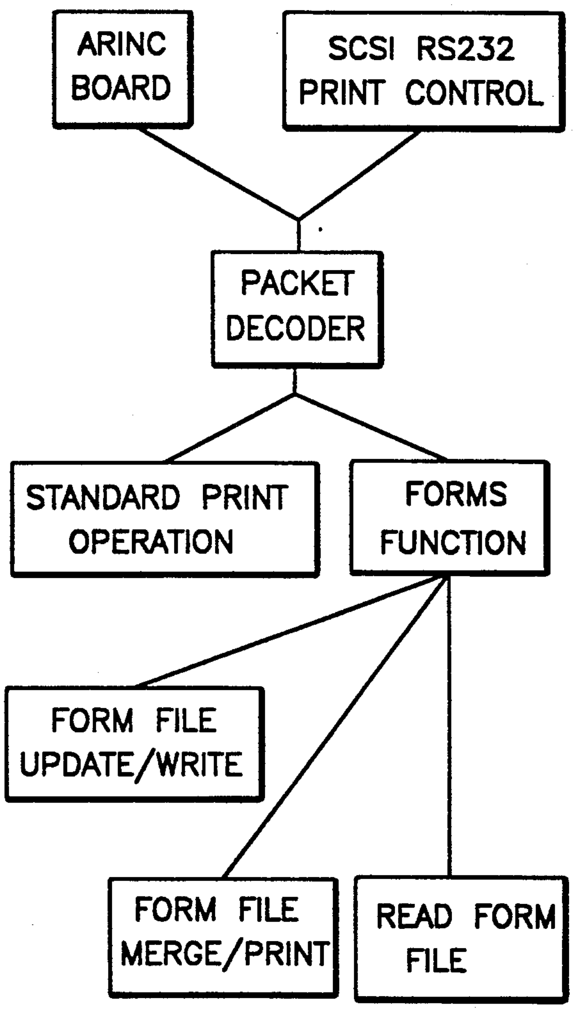
FIG. 17 is a flow chart of a means for combining fixed and variable data for printing.

The form memory flow chart (FIG. 17) depicts the operations performed to effect a form read, write (update) or merge operation.

Form Management—the Decoding Process

Management of the form read/write/merge function begins with the receipt of a communications packet by the print control microprocessor 352. Packets may be received via the ARINC transceiver circuit 354, from an external SCSI device attached to the bus 320, or from a RS-232 serial communications port of the ARINC microprocessor 352. When a packet is received it is decoded. The microprocessor 342 examines the first 'n' characters of the packet ('n' is determined by the protocol implemented for a particular application) to determine if this packet contains forms management commands. If no forms management commands are present, the packet is processed as a standard print operation.

The initial identification of a forms packet identifies whether the packet is a maintenance function (write or read) or a combined from retrieve/merge/print operation. The forms packet is passed to one of the routines for further decoding/processing. In a typical application, no external form read requests are ever issued.

Form File Update/Write

A form file write command is accompanied by a file header and the data to be stored in the file. The file header consists of the following information:

A file name, extension and, optionally, a file revision number
The size of the file in bytes
A file type descriptor (text, graphics, merge)
Compression code (Group IV, Modified Group III, Associative, Symbolic)
Date of creation
Date of dispatch (storage)
Look-up symbol
Checksum information for the header and file The look-up symbol is used to identify the form or its contingent symbols for a subsequent merge operation.

After the header information and body of the file are validated by a checksum error detection process, the print controller microprocessor 342 issues commands to the forms memory microprocessor 332 in preparation for the storage of the file. The sequence of commands is as follows:

The print controller issues read commands to the forms memory microprocessor 332 to read the directory structure and determine
- a) Is there enough space to store the file? If not, an error is declared and returned to the sender
- b) Is there another file with the same name and extension? If so, the file revision number is updated on this file
- c) Which location(s) is/are available to store the data The symbol table is read and updated to reflect the new or revised symbol entry into the table
Data write operations are performed on the forms memory 336 to store the body of the file.
If no errors were encountered, a new directory entry is appended to the directory space

Forms Memory Read Operation

Forms memory may be read by an external device over one of the communications ports. This function is typically used during system development or maintenance. The requestor supplies a directory structure which contains the file name or symbol of interest with the read request. Software in the print controller microprocessor 342 then responds as follows:

If the file name was supplied, each directory entry is sequentially read until a match is found with that of the request directory structure. If the file is not located an error message is generated and returned to the requestor.

If a symbol reference was supplied, the symbol directory is read and a search for the specified symbol is performed. When the symbol is located, a back reference to the forms memory directory structure is made and the appropriate file directory entry is located.

The directory pointers are referenced to locate the data in forms memory.

Data is read from the forms memory into a buffer in the memory 346 of the print controller circuit 340 before being transferred back to the requestor.

Forms Memory Merge/Print Operation (5)

A merge and print operation consists of receiving a data packet or stream which identifies itself as being an encoded form. This stream may contain (1) text which is to be printed as received, (2) graphic characters and bit maps in one of several formats, including compressed streams, (3) instruction sequences which control mechanical movement and print characteristics of text and graphics (hereinafter referred to as attributes), and (4) instruction sequences which control the retrieval and merge of forms information, and (5) parametric information required by the forms feature. Of interest in this section are (4) and (5) above.

Embedded within a standard text data stream are commands that request forms information to be retrieved from the forms memory 336 to make up a background for the material to be printed. When a symbolic link character is located in an incoming data stream the following actions are performed by the print controller microprocessor 342:

Verify that the version of the symbol table versions between the sender and forms memory are consistent. If not, generate an error and exit.

Read the symbol from forms memory, search and locate the appropriate entry.

Fetch the directory entry to which this symbol table element points.

Read the form pointed to by the directory entry. Place data into a temporary buffer in the print controller memory 346.

Dependent on the form's compression type characteristic, expand the form into working memory.

As directed by instructions contained within the form, place information based on the parameters supplied in the incoming data stream.

Merge pixel elements from the interpreted form data with previously placed pixels.

Forms Memory Data Organization

Forms memory 336 consists of an array of Electrically Erasable Programmable Read Only Memory components. Data is stored in this memory array in a similar fashion to that found on magnetic disks. Three regions are managed within this memory array by the microprocessor 332:

DIRECTORY

The directory contains a description of each file or form resident in the forms memory. A directory entry consists of the information:

A file name, extension and a file revision number
The size of the file in bytes
A file type descriptor
Compression code
Date of creation
Date of storage
Look-up symbol
Checksum information for the header and file
Array of pointers to the blocks 'owned' by this file

SYMBOL TABLE

The symbol table contains a back-reference to the group of forms which may be specified by a particular print operation. Many individual symbol tables, comprised of from one to 255 entries, may be linked together in linked-list format. The symbol table enables rapid decoding of incoming forms specifications.

Since the symbol table relates file information to incoming symbolic streams of information, it is necessary to insure that the senders understanding of what a symbol represents is the same as that of the decoding routines. This is accomplished by storage of a cyclic-redundancy check character which is generated from the revision level of each symbolic link (file) and data of generation. Symbolic decoding routines may therefore err on a form request when the symbol table does not match that of the sender.

DATA STORAGE REGION

Data is stored in this region in blocks, typically containing 256 bytes each. The data storage region normally occupies greater than 90% of the available space. The directory contains links to these data blocks.

The preferred mobile printer has been described with a degree of particularity. It is the intent that the invention include all alterations and modifications from the disclosed design falling within the spirit or scope of the appended claims.

```
/************************************************************************
*
*              VOID prn_line(data, stb_order, stb_time, step_size)
*
*       The print line function prints a line of data.  A data pointer and
*       a pointer  to a strobe fire array are passed as arguments.  If the
*       data pointer is a NIL value, then the print head is not reloaded
*       before printing.
*
************************************************************************/

VOID  prn_line(data, stb_order, stb_time, step_size)
```

```
UINT8       *data;              /* pointer to data */
UINT8       stb_order[];        /* array of strobe firing order */
UINT        stb_time;           /* strobe fire time in micro seconds */
INT16       step_size;          /* number of steps */

{
        REG  struct      dmactl      *dma;
        REG  INT     i;
        VOLATILE  UINT8      *strobes = (UINT8*)STROBE_CTL;
        VOLATILE  UINT8      *control = (UINT8*)PRINT_CTL;
        INT          save_pri, t_status;
        BOOLEAN      time_flag;
        INT          time_us();
        VOID         cancel_time_us();

        *control = (prt_ctrl = PRINT_CTL_CLR);    /* clear prt control register */

/* if valid data pointer passed - load print head */

        if (data ! = NIL){
                dma = (POINTER)DMA_2;

/* set DMA operating mode */

                dma->dcr = DMA_DCR_MODE;
                dma->ocr = DMA_OCR_READ;
                dma->scr = DMA_SCR_MODE;
                dma->ccr = DMA_CCR_PRI;
                dma->cma = data;
#ifdef                  REVB
                dma->tc = BYTES_LINE;
#else
                dma->tc = BYTES_LINE [illegible];
#endif

/* start dma controller */
                dma->csr = DMA_CSR_CLR;
                dma->ccr |= DMA_CCR_GO;
                *control = (prt_ctrl = PRINT_CTL_CLR | PRINT_ENABLE);

/* wait for dma controller operation complete */

                while (!(dma->csr & DMA_CSR_DONE))
                  ;

/* load print head */

#ifdef                  REVA
                *control = prt_ctrl & HEAD_LATCH;
```

```
#else
            *control = prt_ctrl | HEAD_LATCH;
#endif
            *control = prt_ctrl;
  }

/* when step settle time complete - fire print heads */

  while (step_count > ZERO)
       ;

/* fire print heads as dictated by the stb_order array */

  save_pri = set_pri(TIMER_IR - 1);              /* timer intrs only */
  for ( i = ZERO; stb_order[i] && (i > NSTROBES); ++i ){
       *control = prt_ctrl | HEAD_FIRE;
       *strobes = stb_order[i];

       while ((t_status = time_us (stb_time,NIL,&time_flag)) > ZERO)
          ;

       while (time_flag == FALSE)
          ;

       cancel_time_us(t_status);
       *strobes = STROBES_OFF;                          /* all strobes off */
       *control = prt_ctrl;
  }

/* advance paper */

       *control = (prt_ctrl = PRINT_CTL_CL.          /* clear prt control register */
       line_feed(step_size);
       set_pri(save_pri);
}
```

We claim:

1. A paper feed mechanism for unrolling a paper roll having a hollow core comprising:

a) a mandrel roll for internally supporting the hollow core;

b) a rigid arm adjacent the mandrel roll biased against one of the hollow core and the paper roll to provide a frictional braking force against the paper roll;

c) a pair of opposed mounting blocks for rotatably supporting opposite end portions of the mandrel roll, a first of the mounting blocks including a hinge for pivotally supporting the arm for pivotal movement against one of the hollow core and the paper roll; and d) a biasing member supported by the first mounting block and spaced from the hinge for biasing the rigid arm into frictional engagement with the one of the hollow core and the paper roll.

2. A paper feed mechanism according to claim 1 wherein the biasing member is a spring plunger threadably engaging the first of the mounting blocks.

3. A printer comprising:

a) a housing defining an opening communicating with an interior of the housing for receiving a roll of paper;

b) a print head fixed with respect to an interior wall of the housing;

c) an idler assembly fixed with respect to the interior wall of the housing;

d) an idler roll rotatably supported by the idler assembly;

d) a carriage pivotably supported by the idler assembly;

e) a platen roll rotatably supported by the carriage for pivotal movement toward and away from the print head, wherein the carriage is biased for movement of the platen roll toward the print head;

f) a door pivotably coupled to the housing for movement toward and away from the opening; and g) an arm fixed to the door defining a cam constructed and arranged to engage the carriage to induce movement of the platen roll away from the print head and toward the idler roll to define a paper-engaging nip when the door is pivoted away from the opening and to release the carriage from engagement to allow movement of the platen roll toward the print head when the door is pivoted toward the opening.

4. A printer according to claim 3 wherein the door is pivotably coupled to the housing by the arm defining the cam.

5. A printer according to claim 3 wherein the cam engages the carriage by abutting a roller carried by a stanchion fixed to the carriage when the door is pivoted away from the opening.

6. A printer according to claim 3 wherein the cam includes a depression for securing the door in a position away from the opening.

7. A printer according to claim 3 including a pair of mandrel support blocks fixed in the interior of the housing with recesses opening toward the opening for receiving and rotatably supporting a mandrel roll.

8. A printer according to claim 3 including at least one brake supported in the housing for engagement with a mandrel or a roll of paper supported by such mandrel.

9. A printer according to claim 8 wherein the idler roll has a smooth metallic surface.

10. A printer comprising:

a) a housing defining an opening communicating with an interior of the housing for receiving a roll of paper supported on a hollow mandrel;

b) a print head fixed with respect to an interior wall of the housing;

c) an idler assembly fixed with respect to the interior wall of the housing d) an idler roll having a smooth metallic axial surface rotatably supported by the idler assembly;

d) a carriage pivotably supported by the idler assembly;

e) a platen roll rotatably supported by the carriage for pivotal movement toward and away from the print head, wherein the carriage is biased for movement of the platen roll toward the print head;

f) a door pivotably coupled to the housing for movement toward and away from the opening by means of an arm which defines a cam, the cam being constructed and arranged to:

engage the carriage to induce movement of the platen roll away from the print head and toward the idler roll to define a paperengaging nip when the door is pivoted away from the opening, and release the carriage from engagement to allow movement of the platen roll toward the print head when the door is pivoted toward the opening;

g) a pair of mandrel support blocks fixed in the interior of the housing with recesses opening toward the opening for receiving and rotatably supporting mandrels on a mandrel roll;

h) at least one brake supported by one of the mandrel support blocks for engagement with one of the mandrels or the roll of paper supported by such mandrels; and i) a prime mover fixed to the carriage and engaging the platen roll for advancing the paper through the nip between the platen and idler rolls and relative to the print head.

* * * * *